United States Patent
Safarian et al.

(10) Patent No.: US 8,094,025 B2
(45) Date of Patent: *Jan. 10, 2012

(54) INTEGRATED BLOCKER FILTERING RF FRONT END

(75) Inventors: Aminghasem Safarian, Irvine, CA (US); Amin Shameli, Irvine, CA (US); Ahmadreza (Reza) Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/942,415

(22) Filed: Nov. 9, 2010

(65) Prior Publication Data

US 2011/0051670 A1  Mar. 3, 2011

Related U.S. Application Data

(63) Continuation of application No. 11/711,309, filed on Feb. 27, 2007, now Pat. No. 7,898,418, and a continuation of application No. 11/482,882, filed on Jul. 7, 2006, now Pat. No. 7,471,204.

(60) Provisional application No. 60/880,593, filed on Jan. 16, 2007.

(51) Int. Cl.
    *G08B 13/14* (2006.01)

(52) U.S. Cl. .......... 340/572.1; 340/572.4; 340/10.1; 455/307

(58) Field of Classification Search .......... 340/572.1, 340/572.4, 571, 10.1, 10.34, 568.1, 573.1, 340/539.11, 825.49; 455/87, 307, 41, 42.1, 455/456.1, 296; 375/329
See application file for complete search history.

(56) References Cited

U.S. PATENT DOCUMENTS

| 6,294,953 | B1 * | 9/2001 | Steeves .......... 329/341 |
| 7,068,171 | B2 * | 6/2006 | Gardenfors et al. ....... 340/572.1 |
| 7,199,713 | B2 * | 4/2007 | Barink et al. .......... 340/572.1 |

* cited by examiner

*Primary Examiner* — Anh V La
(74) *Attorney, Agent, or Firm* — Garlick Harrison & Markison; Kevin L. Smith

(57) ABSTRACT

A receiver architecture for canceling blocking signals in the receive path includes a low noise amplifier for receiving and amplifying an inbound RF signal to produce an amplified inbound signal, in which the inbound RF signal includes a modulated RF signal and a blocking signal, and a cancellation module for substantially canceling the blocking signal from the amplified inbound RF signal and substantially passing the modulated RF signal. The cancellation module cancels the blocking signal by generating an injection signal representative of the blocking signal, combining the blocking signal with the injection signal to produce an error signal, updating the injection signal based on the error signal and using the injection signal to cancel the blocking signal from the amplified inbound RF signal.

15 Claims, 16 Drawing Sheets

INTEGRATED BLOCKER FILTERING RF FRONT END

CROSS REFERENCE TO RELATED PATENTS/PATENT APPLICATIONS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility patent application Ser. No. 11/711,309, entitled "INTEGRATED BLOCKER FILTERING RF FRONT END," filed Feb. 27, 2007, now issued as U.S. Pat. No. 7,898,418, on Mar. 1, 2011, which claims priority pursuant to 35 U.S.C. §119(e) to the following U.S. Provisional Patent Application which is hereby incorporated herein by reference in its entirety and made part of the present U.S. Utility patent application for all purposes:

a. U.S. Provisional Patent Application Ser. No. 60/880,593, entitled "INTEGRATED BLOCKER FILTERING RF FRONT END," filed Jan. 16, 2007.

The U.S. Utility patent application Ser. No. 11/711,309 claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility patent application Ser. No. 11/482,882, entitled "RECEIVER ARCHITECTURE FOR CANCELING BLOCKING SIGNALS," filed Jul. 7, 2006, now issued as U.S. Pat. No. 7,471,204 on Dec. 30, 2008.

BACKGROUND a. Technical Field

This invention is related generally to wireless communication systems, and more particularly to receiver architectures in wireless communication systems.

b. Description of Related Art

Communication systems support wireless and wire lined communications between wireless and/or wire-lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), wideband CMDA (WCDMA), local multi-point distribution systems (LMDS), multi-channel-multi-point distribution service (MMDS), RFID protocols and/or variations thereof.

Depending on the type of wireless communication system, a wireless communication device, such as a cellular telephone, two-way radio, personal digital assistant (PDA), personal computer (PC), laptop computer, home entertainment equipment, RFID device or other handheld device, communicates directly or indirectly with other wireless communication devices. For direct communications (also known as point-to-point communications), the participating wireless communication devices tune their receivers and transmitters to the same channel or channels (for example, one of a plurality of radio frequency (RF) carriers of the wireless communication system) and communicate over that channel(s). For indirect wireless communications, each wireless communication device communicates directly with an associated base station (for example, for cellular services) and/or an associated access point (for example, for an in-home or in-building wireless network) via an assigned channel. To complete a communication connection between the wireless communication devices, the associated base stations and/or associated access points communicate with each other directly, via a system controller, via the public switched telephone network (PSTN), via the Internet, and/or via some other wide area network.

Each wireless communication device includes a built-in radio transceiver (that is, receiver and transmitter) or is coupled to an associated radio transceiver (for example, a station for in-home and/or in-building wireless communication networks, RF modem, et cetera) that performs analog signal processing tasks as a part of converting data to a radio frequency (RF) signal for transmission and a received RF signal to data. Most communication systems employ different RF frequency bands for transmit and receive. However, some communication systems utilize the same frequency band for transmit and receive.

In cellular communication large blockers are present at the receivers along with the desired signals. The blockers are dominated by self transmitters in full division duplex (FDD) systems, such as WCDMA, since the transmitter and receiver are 'ON' simultaneously. However in time division duplex (TDD) systems, such as GSM, the blockers are from other users' transmitters. The blockers could degrade the sensitivity of the receiver, most likely in three ways: first they could saturate the RX, secondly they could inter-modulate with strong jammers to generate in-band cross-modulation distortion (XMD), and thirdly they might generate low-frequency $2^{nd}$-order inter-modulation distortion ($IMD_2$) at baseband along with the desired received signal. Therefore blocking performance imposes stringent requirements on the integrated receiver designs.

Conventional WCDMA systems deploy off-chip duplex filters before receiver input to reject the out-of-band blockers by 45-55 dB on average, and also to scale down the TX power amplifier (PA) noise floor to at least 10 dB below the thermal noise (kTB in 3.84 MHz bandwidth). To further lower the distortions generated by blockers off-chip RF surface acoustic wave (SAW) filters with typical 20-25 dB blocker rejection are deployed in receiver path between LNA and mixer.

SAW filters, however, introduce several drawbacks: first they have 2-3 dB insertion loss at desired received band. Secondly, the LNA output needs to be matched to the input impedance of SAW filter, 50Ω. To compensate for lower load resistance, LNA consumes more bias current to retain the high gain. Thirdly the output of SAW filter needs to be matched to the input impedance of the proceeded stage, which is typically another LNA. The second LNA compensates the insertion loss of SAW filter in RX band, and also lowers the mixer noise. Finally the SAW filters are off-chip components, which degrade the integration level of transceiver and increase its cost.

Currently, CMOS process fails to provide feasible on-chip inductors with high quality factors (that is, 90-100) to achieve minimum blocker rejection of 20 dB, at tens of mega hertz away from desired signal band (for example 190 MHz frequency spacing in WCDMA). However, a simple RC lowpass filter easily provides 20 dB of rejection in a decade away from the LPF corner frequency. One known solution is to filter blockers at DC or low IF, but, with the blocker filtering after the down conversion mixers, the receiver and/or the down conversion mixers could saturate.

Therefore, a need exists for an architecture capable of canceling blocking signals.

BRIEF SUMMARY OF THE INVENTION

The present invention is directed to apparatus and methods of operation that are further described in the following Brief Description of the Several Views of the Drawing(s), the Detailed Description of the Drawings, and the claims. Other features and advantages of the present invention will become apparent from the following detailed description of the invention made with reference to the accompanying drawings.

BRIEF DESCRIPTION OF THE SEVERAL
VIEWS OF THE DRAWING(S)

DETAILED DESCRIPTION OF THE DRAWINGS

Figure 1:
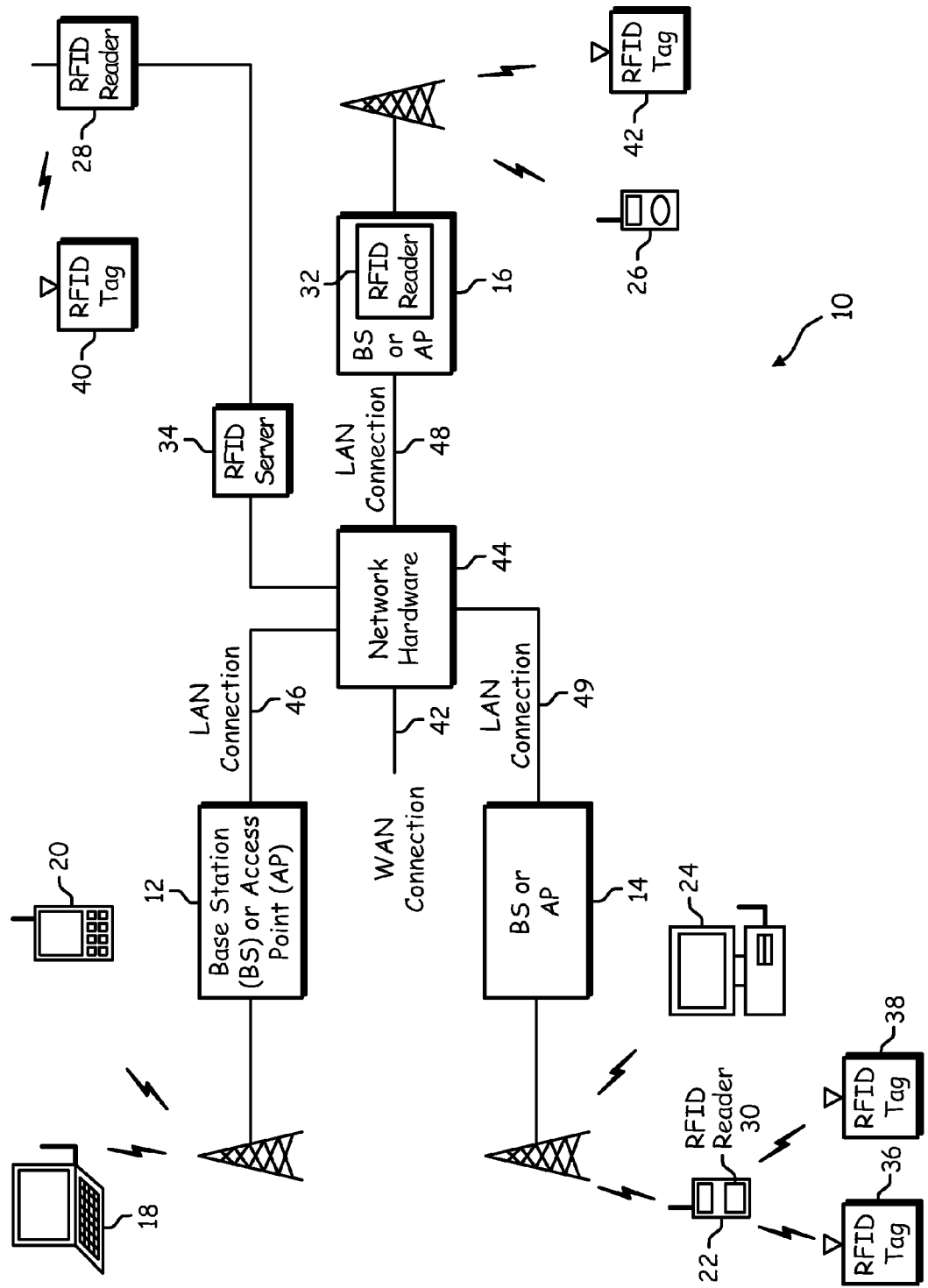
FIG. 1 is a schematic block diagram illustrating a communication system that includes a plurality of wireless communication devices in accordance with embodiments of the present invention.

FIG. 1 is a schematic block diagram illustrating a communication system 10 that includes a plurality of base stations or access points (APs) 12-16, a plurality of wireless communication devices 18-28, a network hardware component 44 and a radio frequency identification (RFID) server 34. The wireless communication devices 18-28 may be laptop computers 18, personal digital assistants 20, cellular telephones 22, personal computers 24, two-way radios 26 and/or radio frequency identification (RFID) readers 28. In addition, the base stations or access points 12-16 may also function as wireless communication devices, in accordance with embodiments of the present invention. Additional details of the wireless communication devices will be described in greater detail with reference to FIGS. 2-12.

The base stations or APs 12-16 are coupled to the network hardware component 44 via local area network (LAN) connections 46-49. The network hardware component 44, which may be a router, switch, bridge, modem, system controller, et cetera, provides a wide area network connection 42 for the communication system 10. Each of the base stations or access points 12-16 has an associated antenna or antenna array to communicate with the wireless communication devices in its area. Typically, the wireless communication devices 18-26 register with the particular base station or access points 12-16 to receive services from the communication system 10. For direct connections (that is, point-to-point communications), wireless communication devices communicate directly via an allocated channel.

Typically, base stations are used for cellular telephone systems and like-type systems, while access points are used for in-home or in-building wireless networks. For example, access points are typically used in Bluetooth systems. Regardless of the particular type of communication system, each wireless communication device and each of the base stations or access points includes a built-in radio and/or is coupled to a radio. The radio includes a transceiver (transmitter and receiver) for modulating/demodulating information (data or speech) bits into a format that comports with the type of communication system.

The network hardware component 44 is also connected to the RFID server 34. The RFID server 34 provides RFID services to one or more RFID readers 28-32. The RFID readers 26, 30 and 32 may be stand-alone devices, or included within another wireless communication device. For example, RFID reader 28 is a stand-alone device, RFID reader 30 is included within wireless communication device 22 and RFID reader 32 is included within base station 16. Each RFID reader 28-32 wirelessly communicates with one or more RFID tags 36-42 within its coverage area. For example, RFID tag 40 may be within the coverage area of RFID reader 28, RFID tags 36 and 38 may be within the coverage area of RFID reader 30, and RFID tag 42 may be within the coverage area of RFID reader 32.

The RFID tags 36-42 may each be associated with a particular object for a variety of purposes including, but not limited to, tracking inventory, tracking status, location determination, assembly progress, et cetera. The RFID tags 36-42 may be active devices that include internal power sources or passive devices that derive power from the RFID readers 28-32. For example, in one embodiment, the RF communication scheme between the RFID readers 28-32 and RFID tags 36-42 is a backscatter technique whereby the RFID readers 28-32 request data from the RFID tags 36-42 via an RF signal, and the RF tags 36-42 respond with the requested data by modulating and backscattering the RF signal provided by the RFID readers 28-32. In another embodiment, the RF communication scheme between the RFID readers 28-32 and RFID tags 36-42 is an inductance technique whereby the RFID readers 28-32 magnetically couple to the RFID tags 36-42 via an RF signal to access the data on the RFID tags 36-42. In either embodiment, the RFID tags 36-42 provide the requested data to the RFID readers 28-32 on the same RF carrier frequency as the RF interrogation signal.

In this manner, the RFID readers 28-32 collect RFID data from each of the RFID tags 36-42 within its coverage area. The collected data may then be conveyed to the RFID server 34 for further processing and/or forwarding of the collected data. For example, the RFID reader 30 incorporated within wireless communication device 22 can provide the collected RFID data to its internal transceiver within wireless communication device 22, which communicates the RFID data to the network hardware component 44 via base station 14 and over LAN connection 49. Then, the network hardware component 44 can provide the RFID data to the RFID server 34 over a wired or wireless connection. As another example, the RFID collected by RFID reader 32 within base station 16 can be passed to the network hardware component 44 over LAN connection 48, and then to the RFID server 34 over a wired or wireless connection. As a further example, the RFID data collected by RFID reader 28 can be passed directly or indirectly to the RFID server 34 over a wired or wireless connection. By way of example, but not limitation, the wired or wireless connection may utilize any one of a plurality of wired standards (for example, Ethernet, fire wire, et cetera) and/or wireless communication standards (for example, IEEE 802.11x, Bluetooth, et cetera).

In addition, and/or in the alternative, the network hardware component 44 may provide data to one or more of the RFID tags 36-42 via the associated RFID reader 28-32. Such downloaded information is application dependent and may vary greatly. Upon receiving the downloaded data, the RFID tag 36-42 can store the data in a non-volatile memory therein.

As one of ordinary skill in the art will appreciate, the communication system 10 of FIG. 1 may be expanded to include a multitude of RFID readers 28-32 distributed throughout a desired location (for example, a building, office site, et cetera) where the RFID tags may be associated with equipment, inventory, personnel, et cetera. In addition, it should be noted that the network hardware component 44 may be coupled to another network device to provide wide area network coverage.

Figure 2:
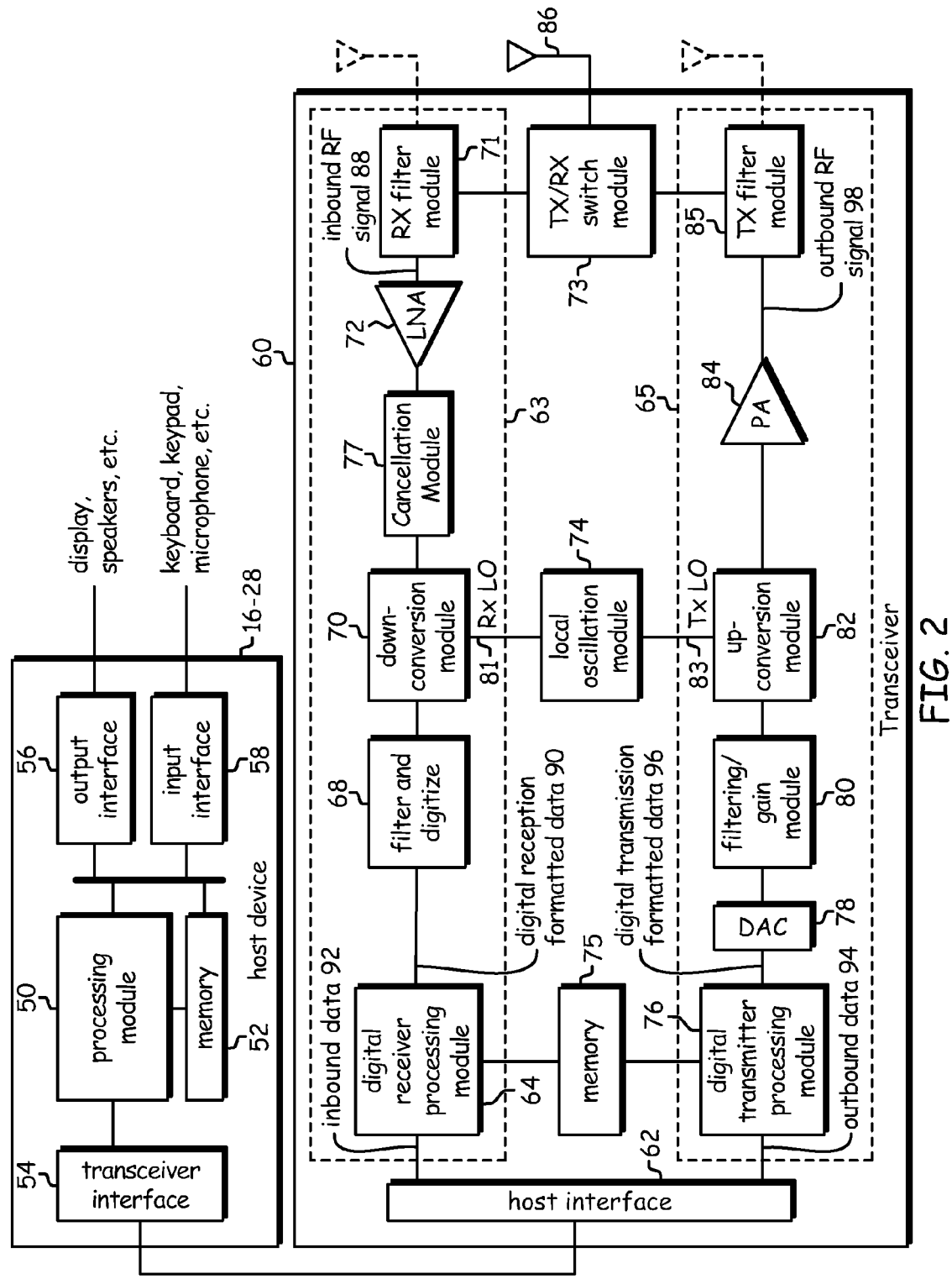
FIG. 2 is a schematic block diagram illustrating a wireless communication device with a transceiver capable of canceling blocking signals in the receive path in accordance with embodiments of the present invention.

FIG. 2 is a schematic block diagram illustrating a wireless communication device 16-28 as a host device and an associated transceiver 60. For cellular telephone, RFID reader, base station (or access point) and two-way radio hosts, the radio 60 is a built-in component. For personal digital assistant, laptop, and/or personal computer hosts, the transceiver 60 may be built-in or an externally coupled component.

As illustrated, the host wireless communication device 16-28 includes a processing module 50, a memory 52, a transceiver interface 54, an input interface 58 and an output interface 56. The processing module 50 and memory 52 execute instructions that are typically performed by the host device. For example, for a cellular telephone, two-way radio, base station or access point and/or RFID reader host device, the processing module 50 performs the corresponding communication functions in accordance with a particular cellular telephone standard and/or an RFID standard.

The transceiver interface 54 allows data to be received from and sent to the transceiver 60. For data received from the transceiver 60 (for example, inbound data), the transceiver interface 54 provides the data to the processing module 50 for further processing and/or routing to the output interface 56. The output interface 56 provides connectivity to an output device such as a display, monitor, speakers, et cetera, such that the received data may be displayed. The transceiver interface 54 also provides data from the processing module 50 to the transceiver 60. The processing module 50 may receive the outbound data from an input device such as a keyboard, keypad, microphone, et cetera, via the input interface 58 or generate the data itself. For data received via the input interface 58, the processing module 50 may perform a corresponding host function on the data and/or route it to the transceiver 60 via the transceiver interface 54.

Transceiver 60 includes a host interface 62, a receiver 63, a transmitter 65, a transmitter/receiver (Tx/Rx) switch module 73, a local oscillation module 74, a memory 75 and an antenna 86. The receiver 63 includes a digital receiver processing module 64, a filter and digitize module 68, a down-conversion module 70, a cancellation module 77, a low noise amplifier 72 and a receiver filter module 71. The filter and digitize module 68 may include an analog bandpass filter and an analog to digital conversion module or it may include the analog to digital conversion module and a digital bandpass filter.

The transmitter 65 includes a digital transmitter processing module 76, a digital-to-analog converter 78, a filtering/gain module 80, an IF mixing up-conversion module 82, a power amplifier 84 and a transmitter filter module 85. In one embodiment, the antenna 86 is shared by the transmit and receive paths as regulated by the Tx/Rx switch module 73. However, the antenna implementation will depend on the particular standard(s) to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling, which may be done in accordance with a WCDMA data demodulation protocol. The digital transmitter functions include, but are not limited to, scrambling, encoding, constellation mapping, and modulation, which may be done in accordance with a WCDMA data modulation protocol. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the digital receiver processing module 64 and/or the digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 75 stores, and the digital receiver processing module 64 and/or the digital transmitter processing module 76 executes, operational instructions corresponding to at least some of the functions illustrated herein.

In operation, the transceiver 60 receives outbound data 94 from the host wireless communication device 18-28 via the host interface 62. The host interface 62 routes the outbound data 94 to the digital transmitter processing module 76, which processes the outbound data 94 in accordance with a particular wireless communication standard (for example, Bluetooth, WCDMA, RFID, et cetera) to produce digital transmission formatted data 96. The digital transmission formatted data 96 will be a digital baseband signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog baseband signal prior to providing it to the up-conversion module 82. The up-conversion module 82 directly converts the analog baseband signal, or low IF signal, into an RF signal based on a transmitter local oscillation 83 provided by local oscillation module 74. The power amplifier 84 amplifies the RF signal to produce an outbound RF signal 98, which is filtered by the transmitter filter module 85. The antenna 86 transmits the outbound RF signal 98 to a targeted device such as a base station, an access point and/or another wireless communication device.

The transceiver 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch module 73, where the Rx filter module 71 bandpass filters the inbound RF signal 88. The Rx filter module 71 provides the filtered RF signal to low noise amplifier 72, which amplifies the inbound RF signal 88 to produce an amplified inbound RF signal.

The low noise amplifier 72 provides the amplified inbound RF signal to cancellation module 77, which cancels any blocking signals in the amplified inbound RF signal resulting from leakage and/or reflection of the transmit power to produce a modulated RF signal. In general, the cancellation module 77 cancels out the average power of any incident signal received at the antenna 86, but not the envelope of the signal that carries the data, by injecting a signal at some point in the receiver chain to cancel out the blocking signal. For example, in embodiments in which the transceiver 60 is within an RFID reader and/or implements an RFID reader functionality, the cancellation module 77 operates to ensure that the energy of any transmitted RF signal does not substantially interfere with the receiving of an in-band back-scattered or other RF signal from one or more RFID tags. As another example, in embodiments in which the transceiver 60 is within a cellular telephone and/or two-way radio that operates in accordance with the WCDMA (Wideband Code Division Multiple Access) communication standard (or other similar communication standard), the cancellation module 77 serves to cancel any out-of-band blocking signals.

The cancellation module 77 provides the modulated RF signal to the down-conversion module 70, which directly converts the modulated RF signal into an inbound low IF signal or baseband signal based on a receiver local oscillation signal 81 provided by local oscillation module 74. The down-conversion module 70 provides the inbound low IF signal or baseband signal to the filtering/gain module 68, which filters and/or attenuates the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by transceiver 60. The host interface 62 provides the recaptured inbound data 92 to the host wireless communication device 18-28 via the transceiver interface 54.

As one of average skill in the art will appreciate, the wireless communication device of FIG. 2 may be implemented using one or more integrated circuits. For example, the host device may be implemented on a first integrated circuit, while the digital receiver processing module 64, the digital transmitter processing module 76 and memory 75 are implemented on a second integrated circuit, and the remaining components of the transceiver 60, less the antenna 86, may be implemented on a third integrated circuit. As an alternate example, the transceiver 60 may be implemented on a single integrated circuit. As yet another example, the processing module 50 of the host device and the digital receiver processing module 64 and the digital transmitter processing module 76 may be a common processing device implemented on a single integrated circuit. Further, memory 52 and memory 75 may be implemented on a single integrated circuit and/or on the same integrated circuit as the common processing modules of processing module 50, the digital receiver processing module 64, and the digital transmitter processing module 76.

The wireless communication device of FIG. 2 is one that may be implemented to include either a direct conversion from RF to baseband and baseband to RF or for a conversion by way of a low intermediate frequency. Thus, while one embodiment of the present invention includes local oscillation module 74, up-conversion module 82 and down-conversion module 70 that are implemented to perform conversion between a low intermediate frequency (IF) and RF, it is understood that the principles herein may also be applied readily to systems that implement a direct conversion between baseband and RF.

Figure 3:
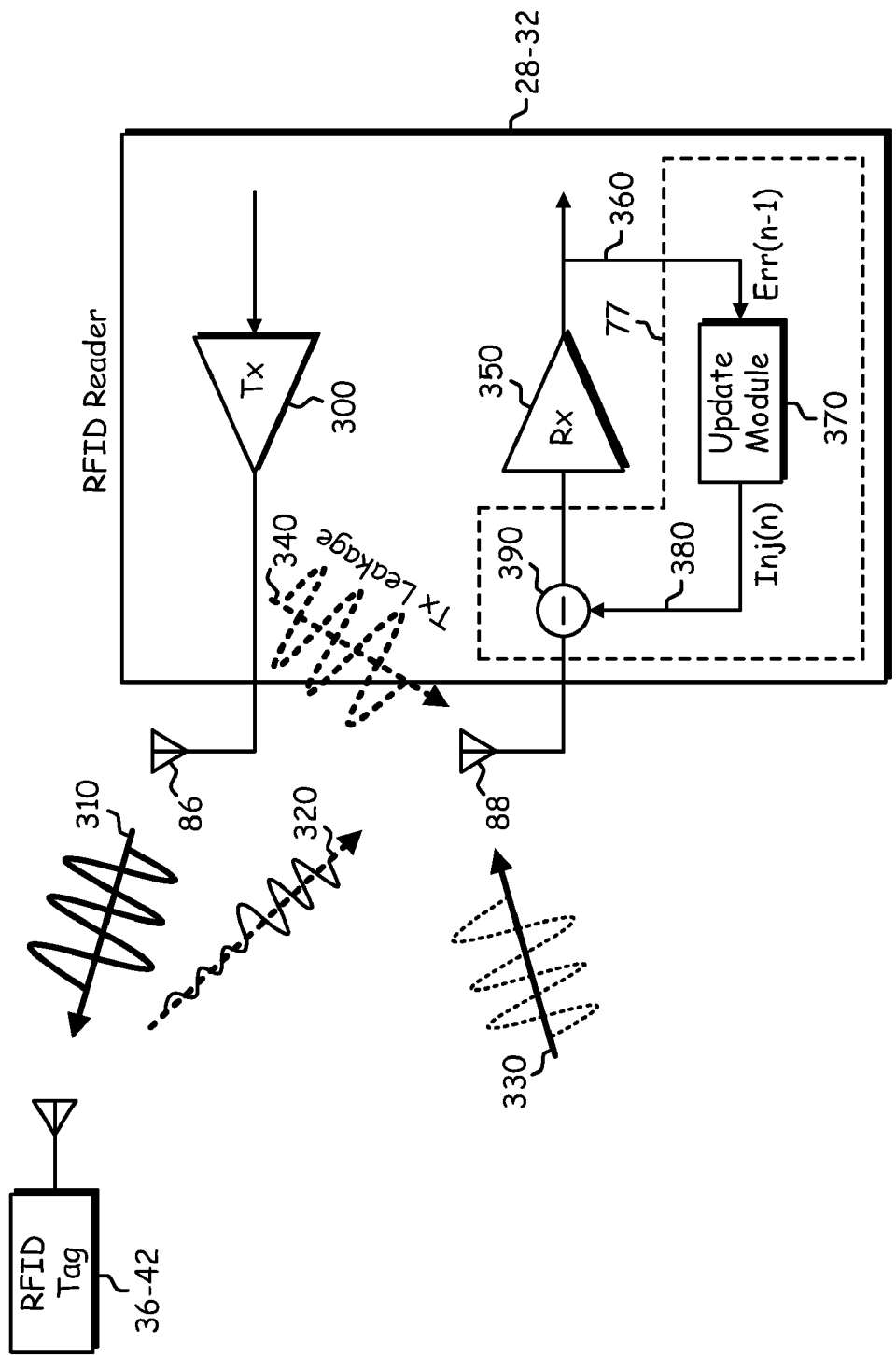
FIG. 3 is a schematic block diagram illustrating a radio frequency identification reader (RFID) capable of canceling blocking signals in the receive path in accordance with embodiments of the present invention.

FIG. 3 is a schematic block diagram of an exemplary RFID reader 28-32 that may be implemented using various components of the wireless communication device and/or transceiver architecture illustrated in FIG. 2, in accordance with the present invention. The RFID reader 28-32 shown in FIG. 3 includes a transmitter 300, a transmit antenna 86, a receiver 350, including a cancellation module 77, and a receive antenna 88. Although separate antennas 86 and 88 are shown for the transmitter 300 and receiver 350, in other embodiments, a single antenna may be shared between the transmitter 300 and receiver 350.

In operation, the transmitter 300 generates a modulated RF interrogation signal 310 designed to evoke a modulated RF response 320 from an RFID tag 36-42. The modulated RF signal 320 from the tag 36-42 includes, for example, coded identification data stored in the RFID tag 36-42. The receiver 350 decodes the coded identification data to identify the person, article, parcel or other object associated with the RFID tag 36-42. For passive tags 36-42, the transmitter 300 continues to transmit an unmodulated, continuous wave (CW) signal to activate and power the tag 36-42 during data transfer.

Since the carrier frequency of the inbound modulated RF signal 320 is substantially similar to the carrier frequency of the outbound RF signal 310, each inbound RF signal may include not only the modulated inbound RF signal 320 from an RFID tag 36-42, but also one or more blocking signals 330 and 340 resulting from reflection of the outbound RF signal 310 off other objects near the tag 36-42 (represented by blocking signal 330) and/or leakage of the outbound RF signal from the transmitter 300 into the receiver 350 (represented by blocking signal 340). For example, in embodiments utilizing passive tags, as described above, the RFID reader 28-32 transmits an unmodulated, continuous wave (CW) signal to power the RFID tag 36-42 and allow for backscattering of the RF signal. This CW signal may block or otherwise mask the inbound modulated RF signal 320 received from the RFID tag 36-42.

To identify the desired inbound modulated RF signal 320 from an RFID tag 36-42, the inbound RF signal is input to the cancellation module 77. As described above in connection with FIG. 2, the cancellation module 77 substantially cancels the blocking signals 330 and 340 from the inbound RF signal and substantially passes the modulated RF signal 320 by subtracting the blocking signals 330 and 340 produced by the transmitter 300 from the received inbound RF signal.

In particular, the cancellation module 77 includes an update module 370 and an injection module 390 coupled in a feedback loop with the receiver 350. The update module 370 is operable to generate an injection signal 380. For example, in one embodiment, the update module 380 is operable to determine the phase and amplitude of the injection signal 380 from an outbound RF signal (for example, signal 310) generated by the transmitter 300. In another embodiment, the update module 380 is operable to determine the amplitude of the injection signal 380 from the inbound signal received at the receiver antenna 88.

The injection module 390 is coupled to receive the inbound RF signal from antenna 88. As described above, the inbound RF signal may include not only the desired inbound modulated RF signal 320 produced by the RFID tag 36-42, but may also include one or more blocking signals 330 and 340. Therefore, the injection module 390 is further coupled to receive the injection signal 380 from the update module 370 and to combine the inbound RF signal with the injection signal 380 to produce a modified RF signal. The modified RF signal includes the modulated RF signal 320 and a modified blocking signal. In exemplary embodiments, the injection module 390 includes a subtraction module that is coupled to receive the inbound RF signal and the injection signal 380. The subtraction module subtracts the injection signal 380 from the inbound RF signal to produce the modified RF signal.

The modified blocking signal is provided to the update module 370 via the feedback loop as an error signal 360 for use by the update module 370 in updating the injection signal 380. For example, the update module 370 can continually adjust the phase and/or amplitude of the injection signal 380 in response to the error signal 360. As a result, the feedback loop operates to minimize the modified blocking signal, thereby substantially canceling the blocking signal from the inbound RF signal and substantially passing the modulated RF signal.

In an exemplary operation of the cancellation module 77, since the injection and error signals 380 and 360, respectively, are continuous in time, sampled at time nT, where T is the period of estimation of the error signal 360 and construction of the injection signal 380, the current injection signal, Inj(n), 380 may be estimated using the following recursive equation:

$$Inj(n)=Inj(n-1)+Err(n-1)$$

This process continues until the system converges at the point where Err(n+1)=Err(n). By using a recursive equation to estimate the injection signal 380, the cancellation module 77 is robust to system non-idealities, such as non-zero loop phase and non-unity loop gain.

The cancellation module 77 can be implemented at any point in the receiver chain to cancel out the blocking signals 330 and 340. However, the receiver 350 should be linear before the point of injection and the rest of the receiver chain after the point of injection should operate in a linear fashion so the weak modulated RF signal 320 does not vanish. In addition, the injection signal 380 can be input to the injection module 390 in either voltage form or current form. Voltage form injection is applied prior to the low noise amplifier (LNA) in the receiver 350, and a monolithic transformer may be required at the input to the injection module 390. Current form injection is applied after the LNA in the receiver 350, and can be implemented via a simple connection of two nodes or wires to perform current subtraction.

Figure 4:
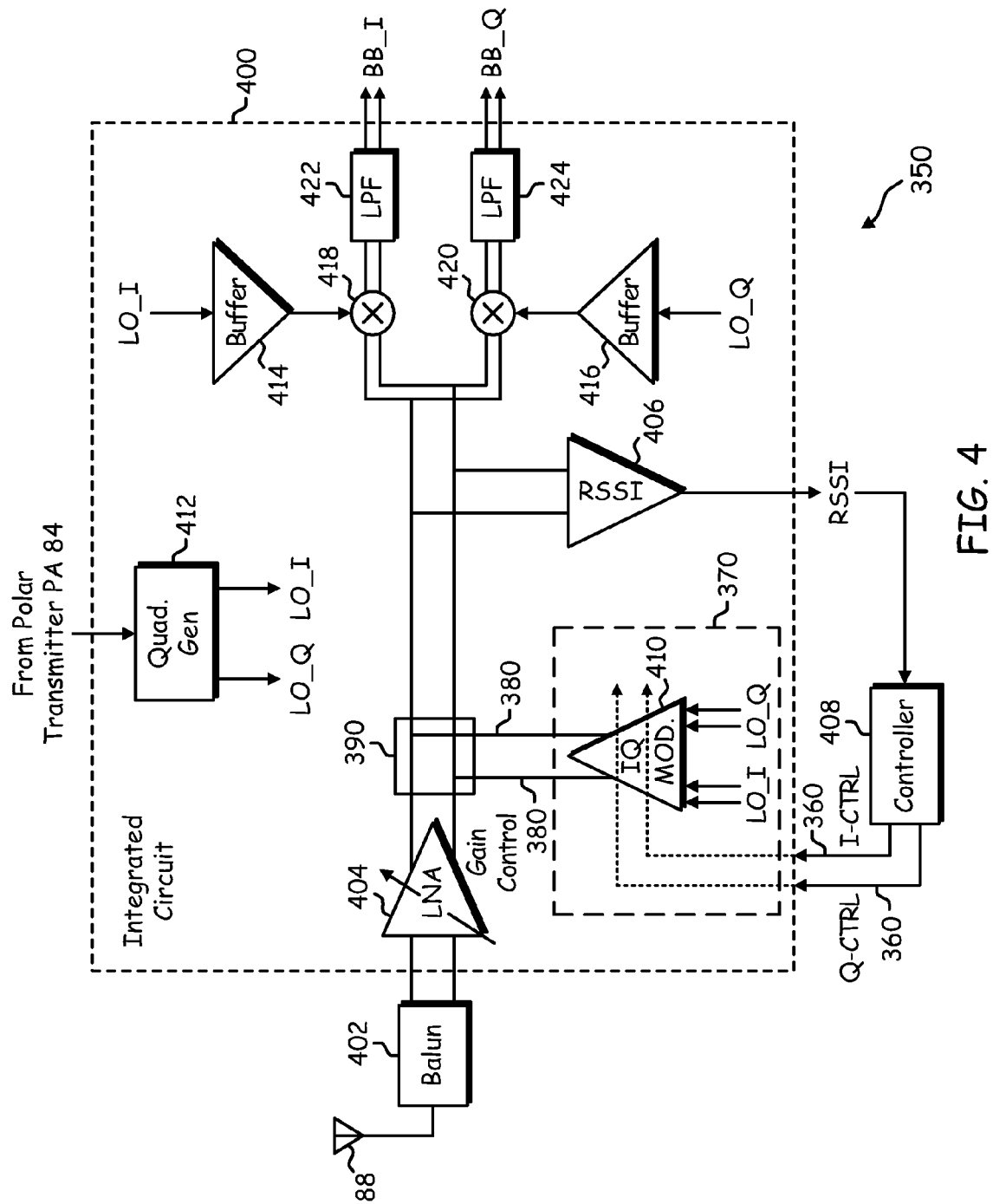
FIG. 4 is a schematic block diagram illustrating an exemplary receiver architecture for canceling blocking signals in accordance with embodiments of the present invention.

FIG. 4 is a schematic block diagram illustrating an exemplary architecture for a receiver 350 capable of canceling blocking signals in accordance with embodiments of the present invention. The receiver architecture shown in FIG. 4 can be included as part of a transceiver within any type of wireless communication device, including, but not limited to, a cellular telephone, RFID reader, base station (or access point), two-way radio, personal digital assistant, laptop, or personal computer. In general, the receiver 350 includes an antenna 88, an integrated circuit 400 and a balun 402. The balun 402 may be either off-chip (as shown) or within the integrated circuit 400. An inbound RF signal received at antenna 88 includes a modulated RF signal and one or more blocking signals, as described above. The inbound RF signal is input to balun 402, where the inbound RF signal is converted into a differential inbound RF signal. The differential inbound RF signal is input to the integrated circuit 400 for cancellation of any blocking signals in the differential inbound RF signal and passage of a differential modulated RF signal.

More specifically, the integrated circuit 400 of FIG. 4 includes a low noise amplifier (LNA) 404, a receiver signal strength indicator (RSSI) 406, an update module 370 and an injection module 390 coupled in a feedback loop. A controller 408 may also be included within the integrated circuit 400 or outside the integrated circuit 400, the latter being illustrated in FIG. 4. The RSSI 406, controller 408, update module 370 and injection module 390, as coupled in the feedback loop, perform the function of the cancellation module 77 of FIGS. 2 and 3 to cancel any blocking signals in the inbound RF signal.

In particular, the update module 370 includes an I/Q modulator 410 coupled to receive in-phase and quadrature-phase signals, LO_I and LO_Q, generated by a quadrature generator 412. The quadrature module 412 is coupled to receive an output of a polar transmitter associated with the receiver 350 (for example, a polar transmitter within the transceiver containing the receiver 350), and operates to generate the in-phase and quadrature-phase signals, LO_I and LO_Q from the transmitter output. For example, referring again to FIG. 2, the output of the power amplifier 84 of the polar transmitter 65 can be input to the quadrature generator 412 for generation of the in-phase and quadrature-phase signals, LO_I and LO_Q, therefrom. In embodiments in which the outbound RF signal is taken from the output of the power amplifier 84, such an architecture compensates for any phase noise in the outbound RF signal produced by the power amplifier 84. The output of the I/Q modulator 410 is an injection signal 380 that is used to cancel any blocking signals in the inbound RF signal, as described above in connection with FIG. 3.

In an exemplary operation of the receiver architecture of FIG. 4, the LNA 404 is coupled to receive the differential inbound RF signal from the balun 402 and operates linearly (not masked or saturated) to amplify the differential inbound RF signal to produce an amplified differential inbound RF signal. Thus, in FIG. 4, the LNA 404 amplifies both the desired modulated RF signal and any blocking signals present in the differential inbound RF signal. The amplified differential inbound RF signal is input to the injection module 390. The injection module 390 shown in FIG. 4 is a current injection module that operates to subtract a differential injection signal 380 from the amplified differential inbound RF signal, in current form, to produce a modified differential RF signal. The modified differential RF signal includes the desired modulated RF signal and a modified blocking signal, produced as a result of the subtraction process.

The modified differential RF signal is input to the RSSI 406, where the DC power of the modified differential RF signal is measured to produce an RSSI signal. Since the desired modulated RF signal is weak as compared to the power of the modified blocking signal, the modulated RF signal is rejected in the RSSI 406, and therefore, the RSSI signal output from the RSSI 406 is indicative of the signal strength of the modified blocking signal. The controller 408 is coupled to receive the RSSI signal, and is operable to produce the error signal 360, represented by signals Q-CTRL and I-CTRL, based on the RSSI signal. The I-CTRL and Q-CTRL signals are used by the I/Q modulator 410 to adjust the phase and amplitude of the in-phase and quadrature-phase signals, LO_I and LO_Q, respectively, to generate the differential injection signal 380. For example, in one embodiment, the I/Q modulator 410 includes a pair of mixers at the output thereof for combining the in-phase and quadrature-phase signals LO_I and LO_Q with the I-CTRL and Q-CTRL signals, respectively.

The differential injection signal 380 is applied to the injection module 390, as described above, for cancellation of the differential injection signal 380 from the differential amplified inbound RF signal to produce the modified inbound RF signal. As also described above, the modified inbound RF signal includes both the desired modulated RF signal and the blocking signal as modified from the subtraction of the injection signal 380. The modified blocking signal is minimized through the feed-back loop. As a result, the injection module 390 substantially cancels the blocking signal(s) while substantially passing the modulated RF signal. In other embodiments, the injection module 390 can be implemented before the LNA 404 or within the LNA 404 for cancellation of the blocking signals in voltage form or current form.

As mentioned above, the blocking signals can be static blocking signals resulting from leakage of the transmit power via the transmitter power amplifier on-chip and on-board or dynamic blocking signals resulting from reflection of the transmitted signal off other objects (for example, mobile objects) around the transceiver. Dynamic blocking signals are generally time-variant in phase and amplitude dependent upon the relative positions of the receiver and reflective objects. However, because of path loss, the dynamic blocking signals are typically weaker than static blocking signals. In practice, the blocking signal cancellation is performed on the order of milliseconds and preferably prior to any data communication. Therefore, any blocking signal produced as a result of reflection of the transmitted signal can be treated as a signal with quasi-static phase and amplitude during data communication, resulting in cancellation of both static and dynamic blocking signals.

As an example, at an initial time, t=0, the initial injection signal 380 generated by the I/Q modulator 410 corresponds to the in-phase and quadrature-phase signals, LO_I and LO_Q, generated by the quadrature generator 412. Thus, the initial injection signal 380 at t=0 is taken from the transmitter output. Since the leakage from the transmitter into the receiver is typically larger than any reflected transmit signals (that is, due to path loss in the reflected signals), the outbound RF signal from the transmitter is suitable for an initial estimation of the blocking signal based on the initial values of Q-CTRL and I-CTRL. After subtraction of the initial injection signal 380 from the inbound RF signal at the injection module 390, the power of any remaining blocking signals present in the modified RF signal is measured by the RSSI 406, and the output of the RSSI 406 is used by the controller 408 to produce the error signal 360. The error signal 360 is then input to the I/Q modulator 370 to make adjustments in the amplitude and/or phase of the injection signal 380. The output of the injection module 390 is continually fed to the RSSI 406 via the feed-back loop before and during data communications to ideally match the amplitude and phase of the injection signal to the amplitude and phase of the blocking signal. In practice, the feed-back loop operates to minimize the RSSI signal, and therefore, substantially cancel any blocking signals from the amplified inbound RF signal.

The integrated circuit 400 further includes buffers 414 and 416, down-conversion mixers 418 and 420 and low pass filters 422 and 424. The buffers 414 and 416 are coupled to receive the in-phase and quadrature-phase signals, LO_I and LO_Q, respectively, generated by the quadrature generator 412, and to input the in-phase and quadrature-phase signals to respective mixers 418 and 420. The mixers 418 and 420 operate to mix the inbound differential modulated RF signal with the in-phase and quadrature-phase signals, respectively, to produce analog differential near baseband signals. The analog differential near baseband signals are input to respective low pass filters 422 and 424 to produce to differential filtered baseband signals, BB_I and BB_Q, respectively.

Figure 5:
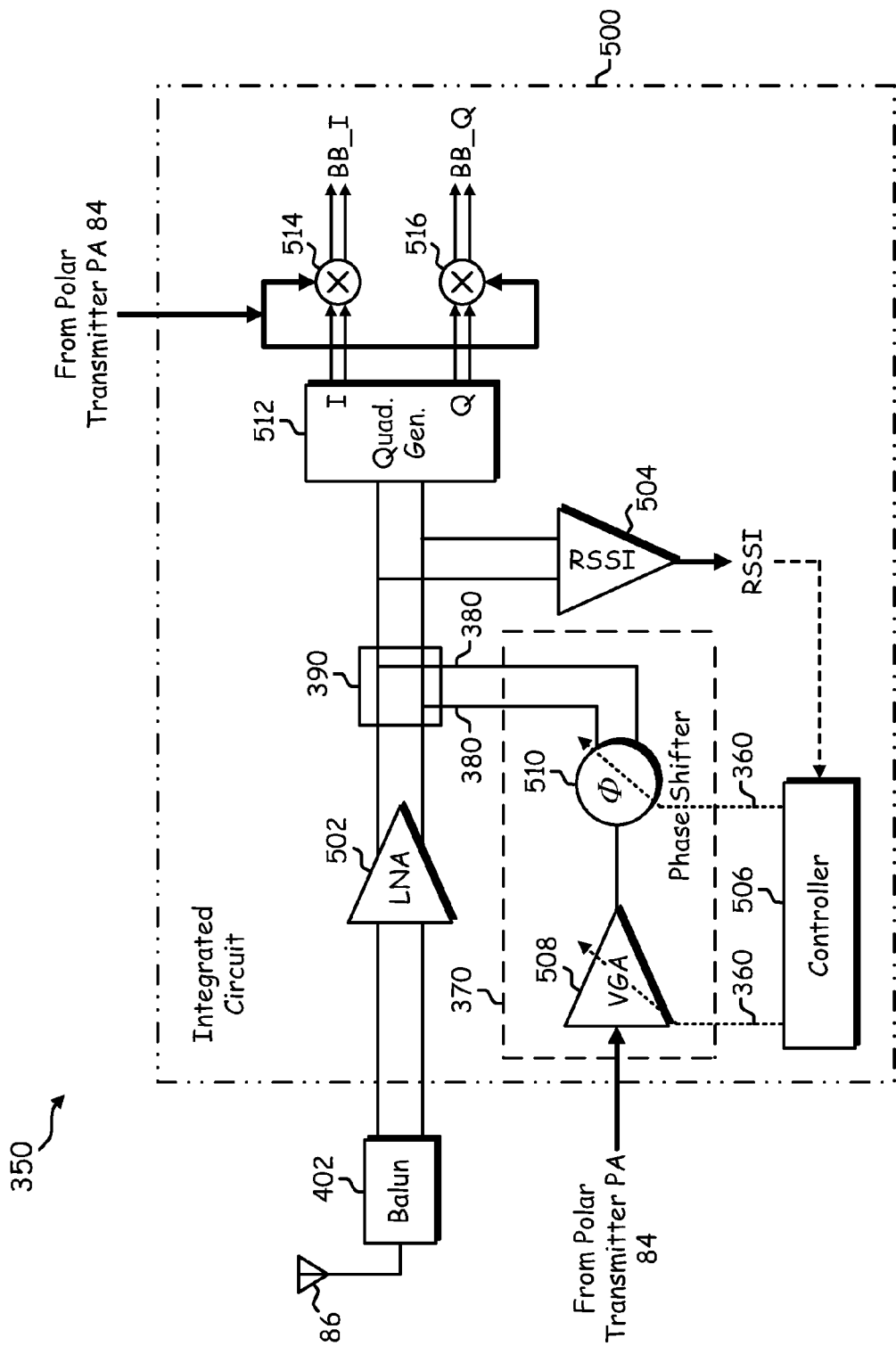
FIG. 5 is a schematic block diagram illustrating another exemplary receiver architecture for canceling blocking signals in accordance with embodiments of the present invention.

FIG. 5 is a schematic block diagram illustrating another exemplary receiver architecture for canceling blocking signals in accordance with embodiments of the present invention. The receiver architecture of FIG. 5 is similar to the receiver architecture of FIG. 4 in that the RSSI 504, controller 506, update module 370 and injection module 390 are coupled in a feedback loop within an integrated circuit 500 to operate as the cancellation module 77 of FIGS. 2 and 3. However, in FIG. 5, the update module 370 includes a variable gain amplifier 508 and a phase shifter 510. In addition, instead of generating in-phase and quadrature-phase signals for input to the update module 370, in FIG. 5, the output from the polar transmitter power amplifier 84 is input directly to the update module 370 to produce the injection signal 380.

In an exemplary operation of the receiver architecture of FIG. 5, the LNA 502 is coupled to receive the differential inbound RF signal from the balun 402 and operates to amplify the differential inbound RF signal to produce an amplified differential inbound RF signal. Thus, as in FIG. 4, the LNA 502 of FIG. 5 amplifies both the desired modulated RF signal and any blocking signals present in the differential inbound RF signal. The amplified differential inbound RF signal is input to the injection module 390. The injection module 390 shown in FIG. 5 is also a current injection module that operates to subtract a differential injection signal 380 from the amplified differential inbound RF signal, in current form, to produce a modified differential RF signal. The modified differential RF signal includes the desired modulated RF signal and a modified blocking signal, produced as a result of the subtraction process.

The modified differential RF signal is input to the RSSI 504, where the DC power of the modified differential RF signal is measured to produce an RSSI signal. Since the desired modulated RF signal is weak as compared to the power of the modified blocking signal, the modulated RF signal is rejected in the RSSI 504, and therefore, the RSSI signal output from the RSSI 504 is indicative of the signal strength of the modified blocking signal. The controller 506 is coupled to receive the RSSI signal, and is operable to produce the error signal 360 based on the RSSI signal. The error signal 360 includes an amplitude error signal and a phase error signal. The amplitude error signal is input to the variable gain amplifier (VGA) 508 to adjust the amplitude of the polar transmitter output, while the phase error signal is input to the phase shifter 510 to adjust the phase of the polar transmitter output to generate the differential injection signal 380.

The differential injection signal 380 is applied to the injection module 390, as described above, for cancellation of the differential injection signal 380 from the differential amplified inbound RF signal to produce the modified inbound RF signal. As also described above, the modified inbound RF signal includes both the desired modulated RF signal and the blocking signal as modified from the subtraction of the injection signal 380. The modified blocking signal is minimized through the feed-back loop. As a result, the injection module 390 substantially cancels the blocking signal(s) while substantially passing the modulated RF signal.

The integrated circuit 500 of FIG. 5 further includes a quadrature generator 512 and down-conversion mixers 514 and 516. The quadrature generator 512 is coupled to receive the inbound differential modulated RF signal from the injection module 390 and to generate in-phase and quadrature-phase signals therefrom. The mixers 514 and 516 operate to mix the in-phase and quadrature-phase signals with the polar transmitter power amplifier 84 output, respectively, to produce analog differential near baseband signals, BB_I and BB_Q, respectively. By making the data quadrature instead of the oscillation signal mixed with the data, any phase noise present in the output of the transmitter power amplifier is down-converted directly to DC, where it can be eliminated.

Figure 6:
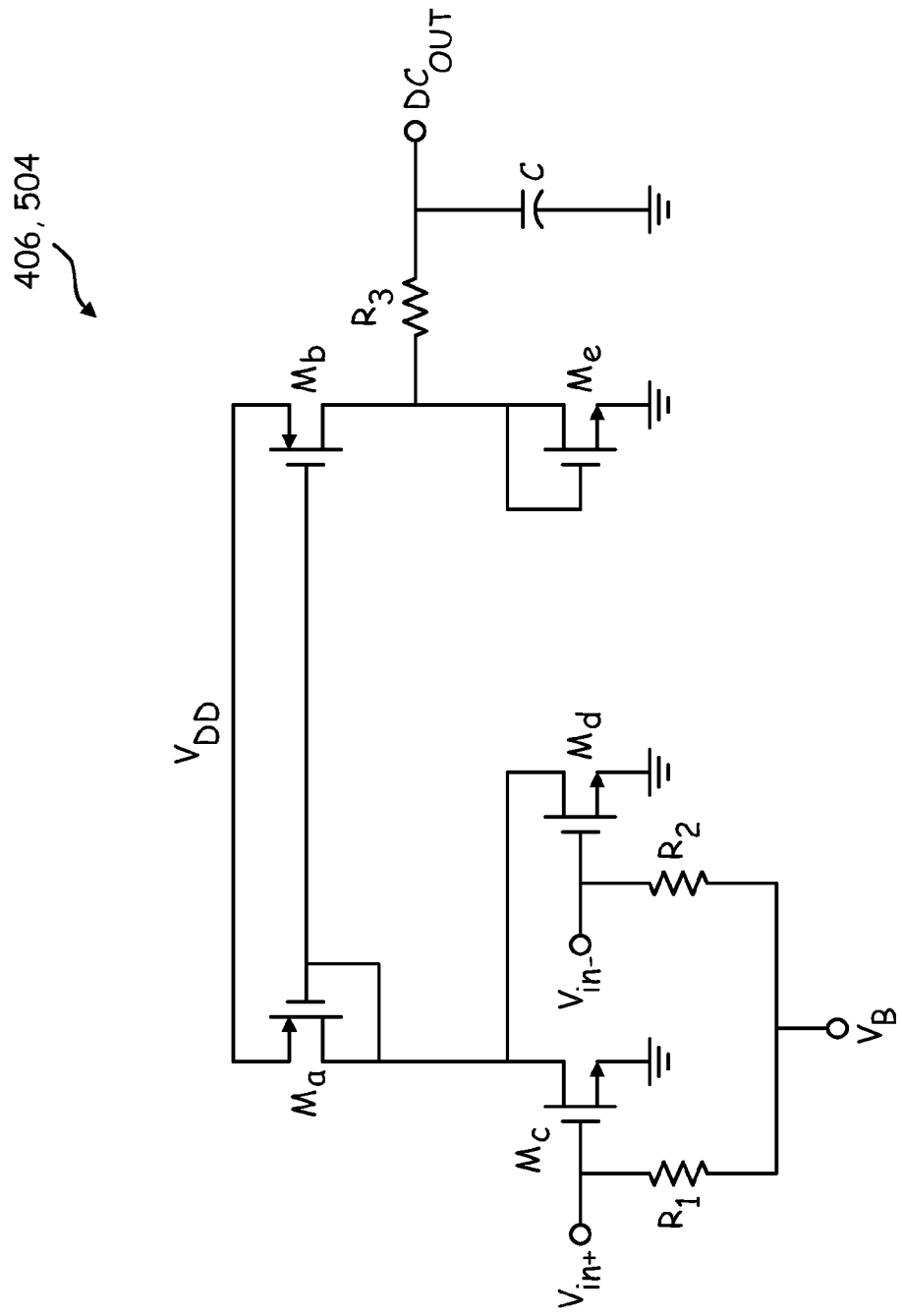
FIG. 6 is a circuit diagram of an exemplary receiver signal strength indicator for use in a receiver capable of canceling blocking signals in accordance with embodiments of the present invention.

FIG. 6 is a circuit diagram of an exemplary receiver signal strength indicator (RSSI) 406, 504 for use in a receiver capable of canceling blocking signals in accordance with embodiments of the present invention. As can be seen from FIG. 6, the RSSI 406, 504 includes both a rectifier and a filter. The rectifier is composed of transistors Ma, Mb, Mc, Md and Me and resistors R1 and R2. The filter is composed of resistor R3 and capacitor C. In operation, the RSSI 406, 504 first rectifies and then filters the inbound RF signal (Vin) to determine the signal strength of the inbound RF signal. Thus, the output of the RSSI 406, 504 is the DC power (DCout) of the inbound RF signal.

Figure 7:
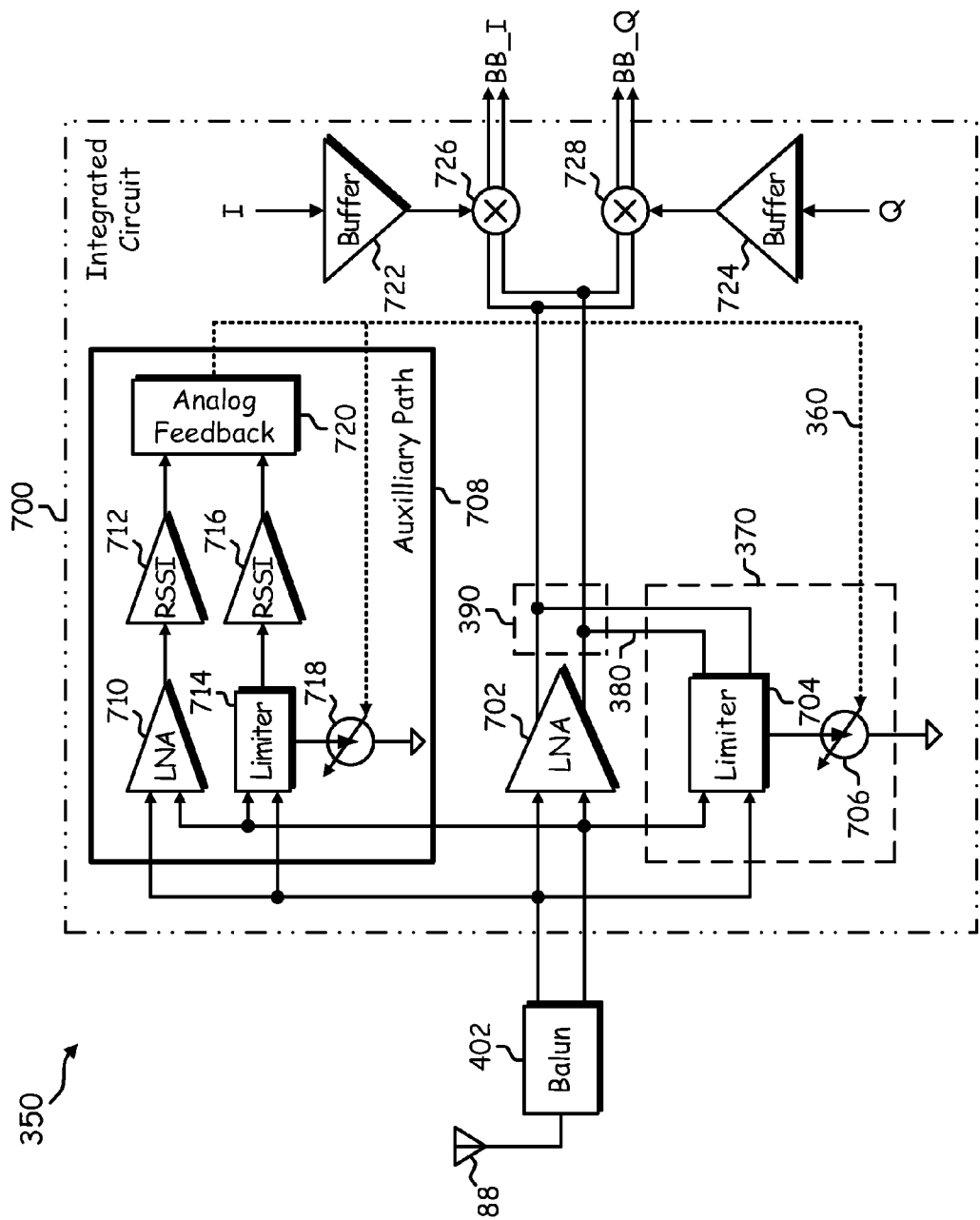
FIG. 7 is a schematic block diagram illustrating another exemplary receiver architecture for canceling blocking signals in accordance with embodiments of the present invention.

FIG. 7 is a schematic block diagram illustrating another exemplary receiver architecture for canceling blocking signals in accordance with embodiments of the present invention. In the receiver architecture of FIG. 7, the injection signal 380 is derived from the inbound RF signal, rather than from the transmitter output. In particular, the update module 370 incorporates a limiter 704 designed to reject the desired modulated RF signal in the inbound RF signal and retain the blocking signal in the inbound RF signal to produce the injection signal 380 and a current source 706 that is operable to adjust the amplitude of the injection signal 380 to match the amplitude of the blocking signal, thereby enabling the blocking signal to be canceled at the LNA 702. Since the injection signal 380 is generated from the inbound RF signal, and assuming that the delay mismatch of the LNA 702 and limiter 704 paths are approximately equal, the phase of the injection signal 380 does not need adjustment. Instead, only the amplitude of the injection signal 380 needs to be adjusted.

In FIG. 7, the error signal 360 is an analog feedback signal that controls the current source 706. The analog feedback signal is generated by an auxiliary path 708 that forms an analog feedback loop. The auxiliary path 708 includes an auxiliary LNA 710, auxiliary limiter 714, auxiliary current source 718, a pair of RSSI's 712 and 716 and an analog feedback module 720. In one embodiment, the auxiliary LNA 710 and auxiliary limiter 714 are smaller than the LNA 702 and limiter 704 in the receive path, therefore, the auxiliary LNA 710 and auxiliary limiter 714 consume less power than the main LNA 702 and limiter 704.

In an exemplary operation, the differential inbound RF signal from the balun 402 is input to the auxiliary LNA 710 and auxiliary limiter 714. The auxiliary LNA 710 amplifies the inbound RF signal to produce an amplified inbound RF signal, while the auxiliary limiter 714 limits the inbound RF signal by rejecting the modulated RF signal in the inbound RF signal and passing the blocking signal in the inbound RF signal. The outputs of the auxiliary LNA 710 and limiter 714 are input to respective RSSIs 712 and 716 to measure the signal strength of the amplified inbound RF signal and the blocking signal, respectively. The outputs of the RSSIs 712 and 716 are input to the analog feedback module 720, which produces an analog feedback signal as the error signal 360. For example, the analog feedback module 720 can generate the error signal 360 based on the difference in signal strength between the outputs of RSSI 712 and RSSI 716. The error signal 360 is input to the auxiliary current source 718 to control the operation of the auxiliary limiter 714. For example, the current source 718 can use the error signal 360 to adjust the amplitude of the blocking signal output from the auxiliary limiter 714 to more closely match the amplitude of the amplified inbound RF signal output from the auxiliary LNA 710.

The differential inbound RF signal from the balun 402 is also input to the LNA 702 and limiter 704 of the update module 370. In addition, the error signal 360 is also input to the current source 706 of the update module 370. As described above, the limiter 704 is designed to reject the desired modulated RF signal in the inbound RF signal and retain the blocking signal in the inbound RF signal to produce the injection signal 380. The current source 706 is controlled by the error signal 360 to adjust the amplitude of the injection signal 380 to substantially match the amplitude of the blocking signal, in a manner similar to that described above with respect to the auxiliary path 708. The injection signal 380 is input to the injection module 390 to substantially cancel the blocking signal in the inbound RF signal. As a result, the output of the injection module 390 is the desired differential modulated RF signal.

The integrated circuit 700 of FIG. 7 further includes buffers 722 and 724 and down-conversion mixers 726 and 728. The buffers 722 and 724 are coupled to receive in-phase and quadrature-phase signals, I and Q, respectively, and to input the in-phase and quadrature-phase signals to respective mixers 726 and 728. The mixers 726 and 728 operate to mix the inbound differential modulated RF signal with the in-phase and quadrature-phase signals, respectively, to produce analog differential near baseband signals, BB_I and BB_Q, respectively.

Figure 8:
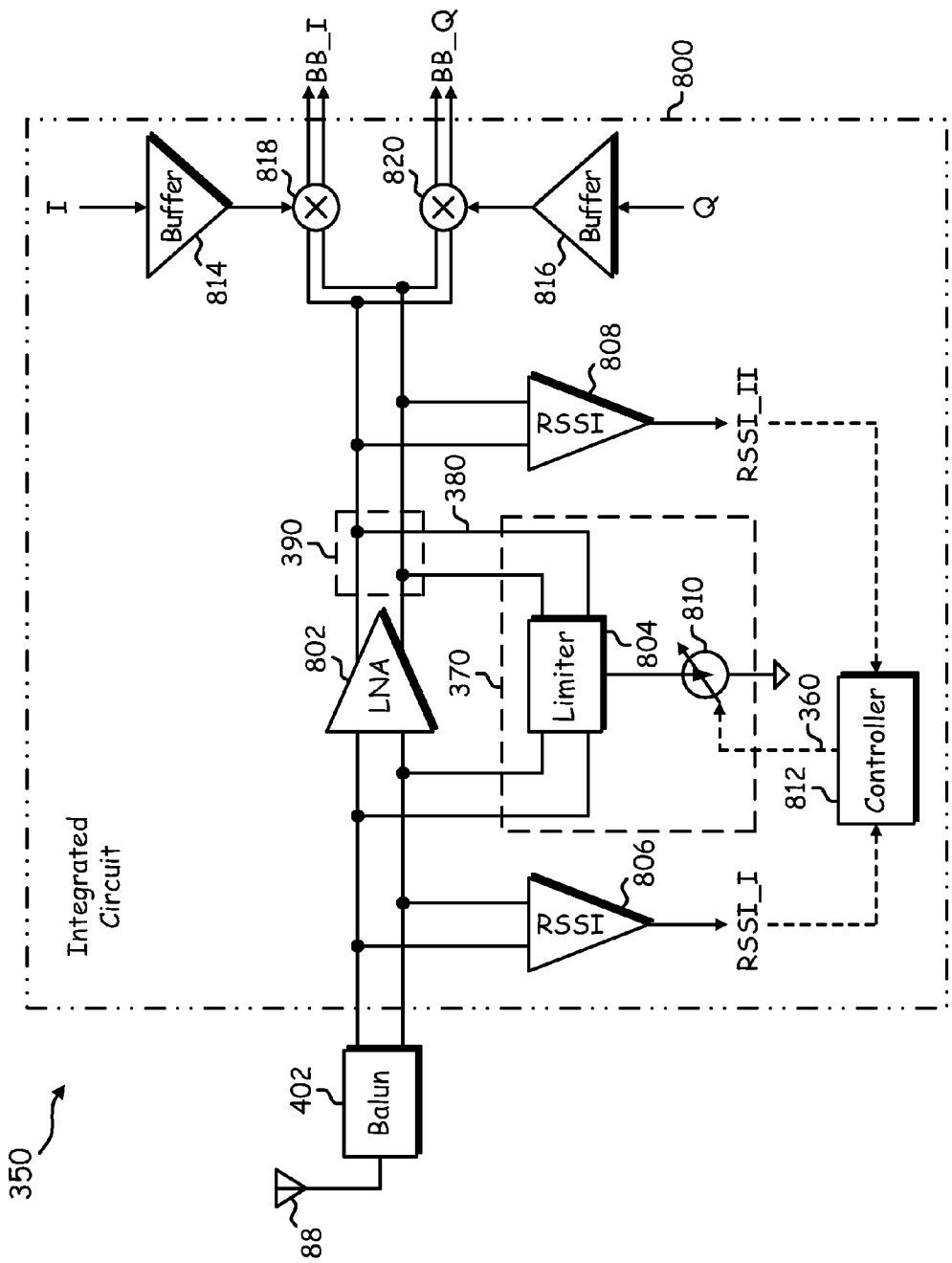
FIG. 8 is a schematic block diagram illustrating another exemplary receiver architecture for canceling blocking signals in accordance with embodiments of the present invention.

FIG. 8 is a schematic block diagram illustrating another exemplary receiver architecture for canceling blocking signals in accordance with embodiments of the present invention. As in FIG. 7, in FIG. 8, the injection signal 380 is derived from the inbound RF signal, rather than from the transmitter output. Thus, again, the update module 370 incorporates a limiter 804 designed to reject the desired modulated RF signal in the inbound RF signal and retain the blocking signal in the inbound RF signal to produce the injection signal 380 and a current source 810 that is operable to adjust the amplitude of the injection signal 380 to match the amplitude of the blocking signal, thereby enabling the blocking signal to be canceled at the LNA 802. Again, since the injection signal 380 is generated from the inbound RF signal, and assuming that the delay mismatch between the LNA 802 and limiter 804 paths is much less than the period of the carrier frequency, the phase of the injection signal 380 does not need adjustment. Instead, only the amplitude of the injection signal 380 needs to be adjusted.

However, in FIG. 8, the error signal 360 is a digital signal produced by the feedback from RSSIs 806 and 808 and a controller 812. In an exemplary operation, the differential inbound RF signal from the balun 402 is input to the RSSI 806 to measure the signal strength of the inbound RF signal and produce an RSSI_I signal. In addition, the amplified inbound RF signal present at the output of the LNA 802 is input to another RSSI 808 to produce the RSSI_II signal. Since the desired modulated RF signal is weak as compared to the power of the modified blocking signal, the modulated RF signal is rejected in each RSSI 806 and 808, and therefore, the RSSI_I signal output from RSSI 806 and the RSSI_II signal output from RSSI 808 are both indicative of the signal strength of the blocking signal. The controller 812 is coupled to receive the RSSI_I signal and the RSSI_II signal, and is operable to produce the error signal 360 in response thereto. For example, the controller 812 can generate the error signal 360 based on the difference in signal strength between RSSI_II and a reference value (ideally zero). As another example, the controller 812 can generate the error signal 360 using an algorithm that considers both RSSI_I and RSSI_II.

The error signal 360 processed by the controller 812 is input to the current source 810 of the update module 370 to control the operation of the limiter 804. As described above, the limiter 804 is designed to reject the desired modulated RF signal in the inbound RF signal and retain the blocking signal in the inbound RF signal to produce the injection signal 380. The error signal 360 controls the bias current of the current source 810, such that the current source 810 adjusts the amplitude of the injection signal 380 output from the limiter 804 to substantially match the amplitude of the blocking signal. The injection signal 380 is input to the injection module 390 to substantially cancel the blocking signal in the inbound RF signal. As a result, the output of the injection module 390 is the desired differential modulated RF signal.

The integrated circuit 800 of FIG. 8 further includes buffers 814 and 816 and down-conversion mixers 818 and 820. The buffers 814 and 816 are coupled to receive in-phase and quadrature-phase signals, I and Q, respectively, and to input the in-phase and quadrature-phase signals to respective mixers 818 and 820. The mixers 818 and 820 operate to mix the inbound differential modulated RF signal with the in-phase and quadrature-phase signals, respectively, to produce analog differential near baseband signals, BB_I and BB_Q, respectively.

Figure 9:
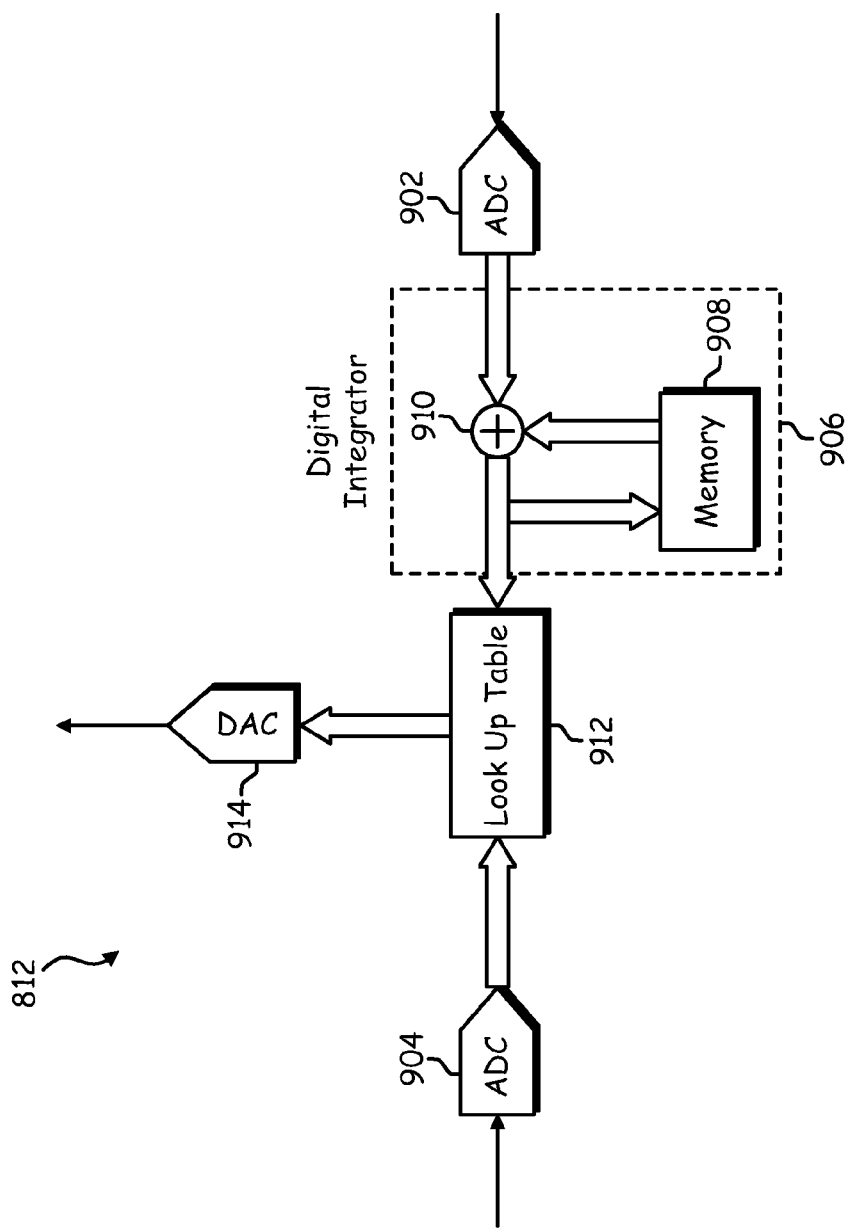
FIG. 9 is a schematic block diagram illustrating an exemplary controller for use in the receiver of FIG. 8.

FIG. 9 is a schematic block diagram illustrating an exemplary controller 812 for use in the receiver of FIG. 8. The controller 812 includes a pair of analog-to-digital converters (ADCs) 902 and 904, a digital integrator 906, a look-up table 912 and a digital-to-analog converter (DAC) 914. ADC 902 is coupled to digitize the RSSI_II signal, while ADC 904 is coupled to digitize the RSSI_I signal. The digital integrator 906 includes a memory 908 and a summation node 910 coupled in a feedback loop. The look-up table 912 stores data in two dimensions. One dimension stores data corresponding to the digital value coming from ADC 904 and the other dimension stores data corresponding to the appropriate bits to be output to the DAC 914 to control the bias current of the current source.

In an exemplary operation, during an initial calibration period, the output of the digital integrator 906 is used to determine the appropriate output bits for the DAC 914 in order to minimize RSSI_II in the feedback loop. After calibration, the look-up table is populated with values in the two dimensions (that is, RSSI_I and DAC bits), and the appropriate bits are loaded into the DAC 914 by mapping the value of RSSI_I into the look-up table 912.

Figure 10:
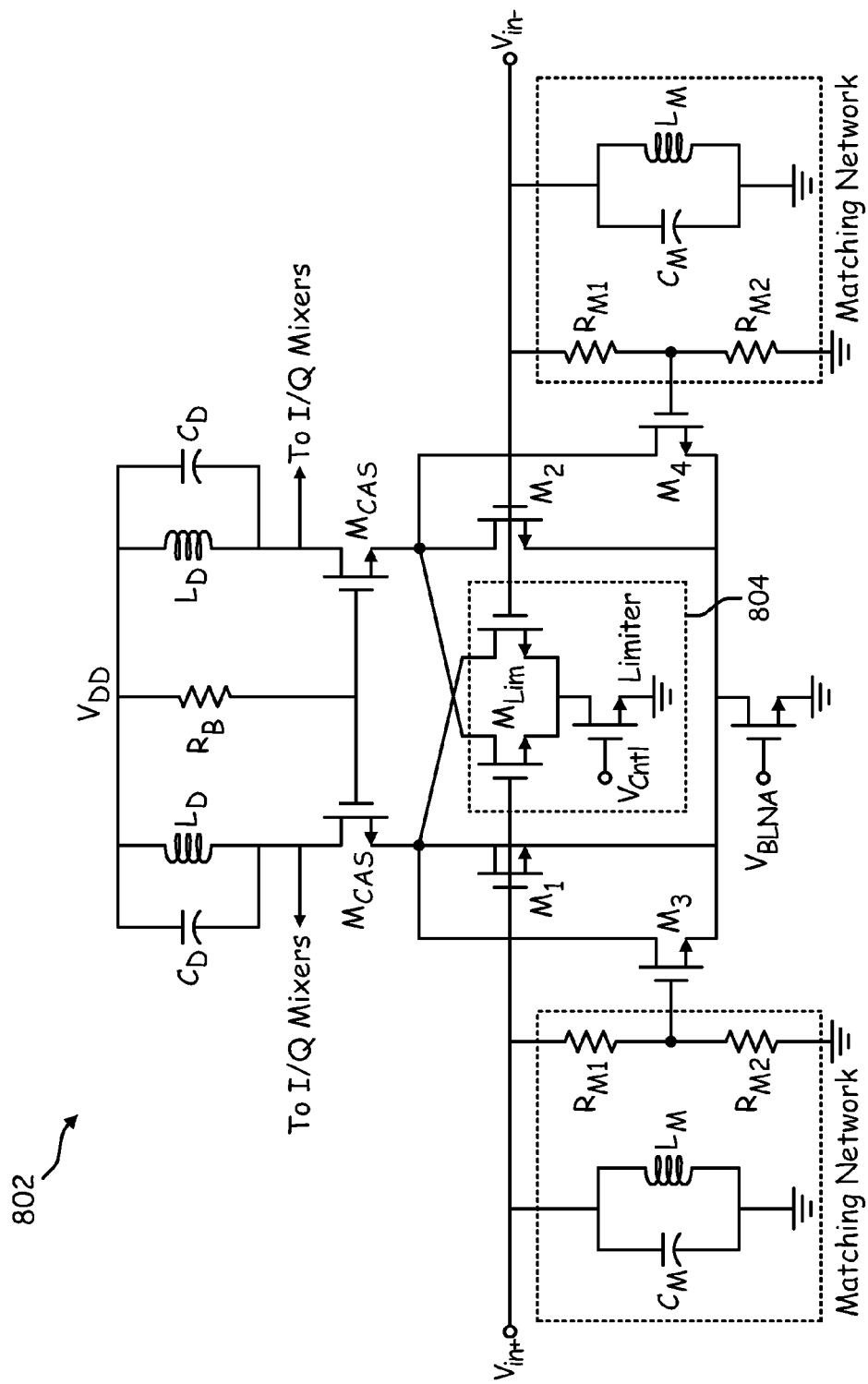
FIG. 10 is a circuit diagram of an exemplary low noise amplifier and limiter for use in the receiver of FIG. 8.

FIG. 10 is a circuit diagram of an exemplary low noise amplifier 802 and limiter 804 for use in the receiver of FIG. 8. A similar circuit arrangement can be used to implement the LNA 702 and limiter 704 of FIG. 7. The LNA 802 is formed of an input stage containing a differential matching network ($C_M$, $L_M$, $R_{M1}$ and $R_{M2}$), a differential transconductance stage ($M_{1-4}$) and a differential amplifier stage ($C_D$, $L_D$ and $R_B$). In an exemplary operation, the transconductance stage converts both the desired modulated RF signal and the blocking signal linearly to current. However, the modulated RF signal vanishes at the limiter 804 since the switching of the transistor $M_{LIM}$ at the input to the limiter 804 is driven by the large blocking signal, and not the weak amplitude modulated RF signal. In the current regime (for example, at the nodes between $M_1/M_2$ and $M_{CAS}$), the blocking signal is canceled, thereby enabling the modulated RF signal to be amplified through the amplifier stage of the LNA 802.

In an exemplary embodiment, the differential input matching network includes a 50Ω on-chip resistor and an LC band-pass with a center frequency equal to the carrier frequency (for example, 900 MHz). In RFID systems, the large blocking signal is always present at the receiver input, and therefore the differential input matching network does not produce any gain, unlike matching networks commonly used in inductive-degeneration. The transconductance stage ($M_{1-4}$) includes both a main transconductance stage ($M_{1-2}$) and a secondary transconductance stage ($M_{3-4}$). The main transconductance stage ($M_{1-2}$) remains linear for blocking signals as large as 10 dBm. Since the limiter transconductance input stage, $M_{Lim}$, operates highly non-linear (switching mode), $M_{LIM}$ rejects the RF modulated and passes the large blocking signal. However, for blocking signal power levels higher than 10 dBm, the secondary transconductance stage ($M_{3-4}$) will be activated. It should be noted that the bias circuit is not shown in FIG. 10. The input signal experiences a loss of $20 \log(R_{M2}/R_{M1}+R_{M2})$ before being applied to $M_{3-4}$. Thus, either $M_{1-2}$ or $M_{3-4}$ will be activated based on the signal strength of the blocking signal.

Figure 11:
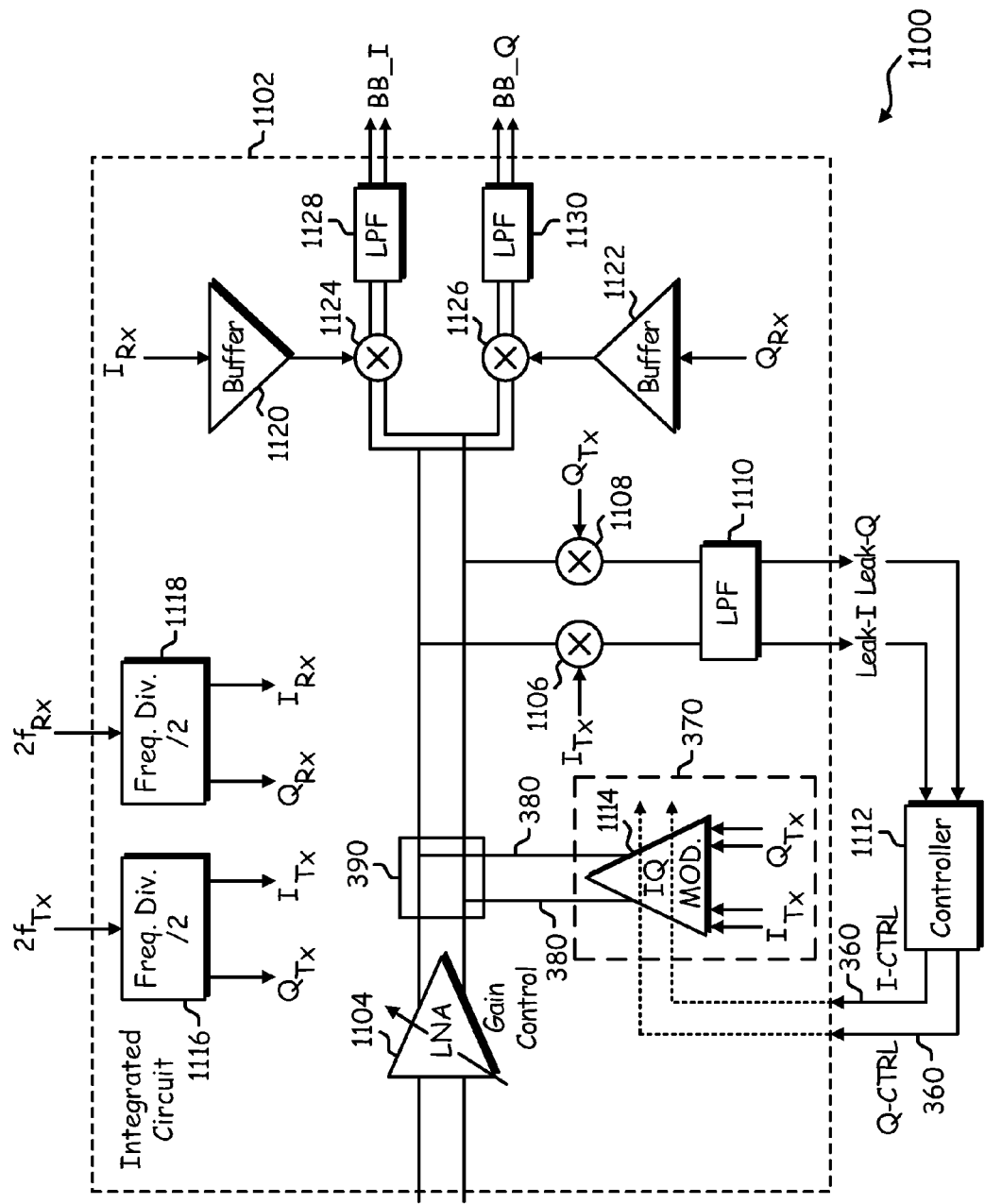
FIG. 11 is a schematic block diagram illustrating another exemplary receiver architecture for canceling blocking signals in accordance with embodiments of the present invention.

FIG. 11 is a schematic block diagram illustrating another exemplary architecture for a receiver 1100 capable of canceling blocking signals in accordance with embodiments of the present invention. The receiver architecture shown in FIG. 11 can be included as part of a transceiver within, for example, a WCDMA receiver or GSM receiver, in which the transmit frequency is different than the receive frequency. In FIG. 11, the receiver 1100 is shown including an integrated circuit 1102. A differential inbound RF signal received at the receiver 1100 is input to the integrated circuit 1102 for cancellation of any blocking signals in the differential inbound RF signal and passage of a differential modulated RF signal.

More specifically, the integrated circuit 1102 of FIG. 11 includes a low noise amplifier (LNA) 1104, down-conversion mixers 1106 and 1108, a low pass filter (LPF) 1110, an update module 370 and an injection module 390 coupled in a feed-back loop. A controller 1112 may also be included within the integrated circuit 1102 or outside the integrated circuit 1102, the latter being illustrated in FIG. 11. The down-conversion mixers 1106 and 1108, LPF 1110, controller 1112, update module 370 and injection module 390, as coupled in the feedback loop, perform the function of the cancellation module 77 of FIGS. 2 and 3 to cancel any blocking signals in the inbound RF signal.

As in FIGS. 4 and 5, the update module 370 includes an I/Q modulator 1114 coupled to receive in-phase and quadrature-phase transmitter signals, $I_{TX}$ and $Q_{TX}$, generated by a frequency divider 1116. The frequency divider 1116 is coupled to receive a transmit signal ($2f_{TX}$) associated with a transmitter, and operates to generate the in-phase and quadrature-phase transmitter signals, $I_{TX}$ and $Q_{TX}$ from the transmit signal. The output of the I/Q modulator 1114 is an injection signal 380 that is used to cancel any blocking signals in the inbound RF signal, as described above.

In an exemplary operation of the receiver architecture of FIG. 11, the LNA 1104 is coupled to receive the differential inbound RF signal and operates to amplify the differential inbound RF signal to produce an amplified differential inbound RF signal. Thus, in FIG. 11, the LNA 1104 amplifies both the desired modulated RF signal and any blocking signals present in the differential inbound RF signal. The amplified differential inbound RF signal is input to the injection module 390. The injection module 390 shown in FIG. 11 is a current injection module that operates to subtract a differential injection signal 380 from the amplified differential inbound RF signal, in current form, to produce a modified differential RF signal. The modified differential RF signal includes the desired modulated RF signal and a modified blocking signal, produced as a result of the subtraction process.

The modified differential RF signal is input to the down-conversion mixers 1106 and 1108. The mixers 1106 and 1108 operate to mix the modified differential RF signal with the in-phase and quadrature-phase transmitter signals, $I_{TX}$ and $Q_{TX}$, respectively, to produce differential leakage baseband signals. Since the desired modulated RF signal is weak as compared to the power of the modified blocking signal, and in WCDMA, the blocking signal is in a different frequency bands than the modulated RF signal, when the modified differential RF signal is down-converted to baseband, the DC power of the leakage baseband signals is indicative of the signal strength of the modified blocking signal. The differential leakage baseband signals are input to the LPF 1110 to produce to differential filtered leakage baseband signals, Leak-I and Leak-Q, respectively, representing the DC power of the modified blocking signal.

The controller 1112 is coupled to receive the differential filtered leakage baseband signals, Leak-I and Leak-Q, and is operable to produce the error signal 360, represented by differential signals Q-CTRL and I-CTRL, based on the Leak-I and Leak-Q signals. The I-CTRL and Q-CTRL signals 360 are used by the I/Q modulator 1114 to adjust the phase and amplitude of the in-phase and quadrature-phase signals, $I_{TX}$ and $Q_{TX}$, respectively, to generate the differential injection signal 380. The differential injection signal 380 is applied to the injection module 390, as described above, for cancellation of the differential injection signal 380 from the differential amplified inbound RF signal to produce the modified inbound RF signal. As also described above, the modified inbound RF signal includes both the desired modulated RF signal and the blocking signal as modified from the subtraction of the injection signal 380. The modified blocking signal is minimized through the feed-back loop. As a result, the injection module 390 substantially cancels the blocking signal(s) while substantially passing the modulated RF signal.

The integrated circuit 1102 further includes buffers 1120 and 1122, down-conversion mixers 1124 and 1126 and low pass filters 1128 and 1130. The buffers 1120 and 1120 are coupled to receive in-phase and quadrature-phase receiver signals, $I_{RX}$ and $Q_{RX}$, respectively, generated by frequency divider 1118 using a receive signal ($2f_{RX}$) associated with the receiver 1100, and to input the in-phase and quadrature-phase receiver signals to respective mixers 1124 and 1126. The mixers 1124 and 1126 operate to mix the inbound differential modulated RF signal with the in-phase and quadrature-phase receiver signals, respectively, to produce analog differential near baseband signals. The analog differential near baseband signals are input to respective low pass filters 1128 and 1130 to produce to differential filtered baseband signals, BB_I and BB_Q, respectively.

In another embodiment, the receiver architecture in FIG. 11 can be modified for use within an RFID reader. Since in RFID systems, the transmit frequency and receive frequency are the same, instead of using the frequency divider modules 1116 and 1118 generating $I_{RX}, I_{TX}, Q_{RX}$ and $Q_{TX}$, a quadrature generator can be provided, as in FIG. 4, to generate LO_I and LO_Q for input to the mixers 1106, 1108 and mixers 1120 and 1122. In an alternative RFID embodiment, mixers 1106 and 1108 and LPF 1110 can be removed, and the output of LPFs 1128 and 1130 can provide the feedback signals Leak-I and Leak-Q to the controller 1112 during a calibration period. After calibration, the feedback from LPFs 1128 and 1130 to the controller 1112 can be disconnected and LPFs 1128 and 1130 can be used for regular receiver operation.

Figure 12A:
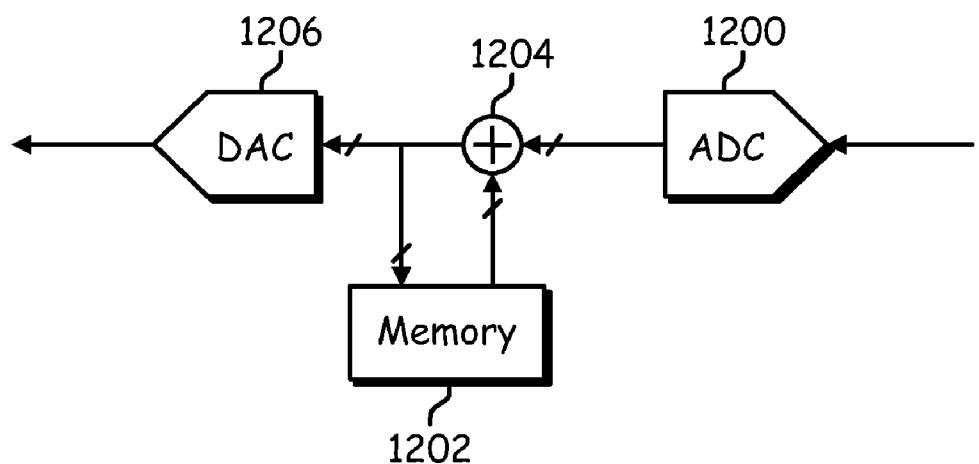
FIG. 12A is a schematic block diagram illustrating an exemplary controller for use in a receiver capable of canceling blocking signals in accordance with embodiments of the present invention.

FIG. 12A is a schematic block diagram illustrating an exemplary controller 408, 506, 1112 for use in a receiver capable of canceling blocking signals in accordance with embodiments of the present invention. For example, the controller 408, 506, 1112 can be implemented in the receiver architectures of FIG. 4, 5 or 11. The controller 408, 506, 1112 includes an analog-to-digital converter (ADC) 1200, a digital integrator coupled to the ADC 1200 and formed of a memory 1202 and a summation node 1204 coupled in a feedback loop and a digital-to-analog converter (DAC) 1206 coupled to the digital integrator. The controller 408, 506, 112 is coupled to receive the differential signals from the feedback loop (for example, RSSI signals from FIG. 4 or 5 or Leak-I and Leak Q from FIG. 11). The output of the DAC 1206 is the error signal 360, as shown in FIG. 4, 5 or 11.

In FIG. 12A, only one of the differential signals (for example, either the differential Leak_I or the differential Leak_Q signal) is input to the controller 408, 506, 1112 at a time to re-use the ADC 1200, thereby consuming less power and area. Therefore, the operation of the controller 408, 506, 1112 will be described with reference to a single input signal. However, it should be understood that the controller 408, 506, 1112 operates on each of the differential signals, and that the operation for each of the differential signals is the same. The ADC 1200 is coupled to digitize the signal input to the controller 408, 506, 1112. As mentioned above, the RSSI signal or Leak-I/Leak-Q signal represents the DC power of the modified blocking signal. Thus, the memory 1202 and summation node 1204 operate to increase or decrease the error signal (for example, I-CTRL or Q-CTRL) based on the DC power of the modified blocking signal. As the DC power of the modified blocking signal is minimized (through the feedback loop), the changes made to the error signal by the digital integrator are also minimized.

Figure 12B:
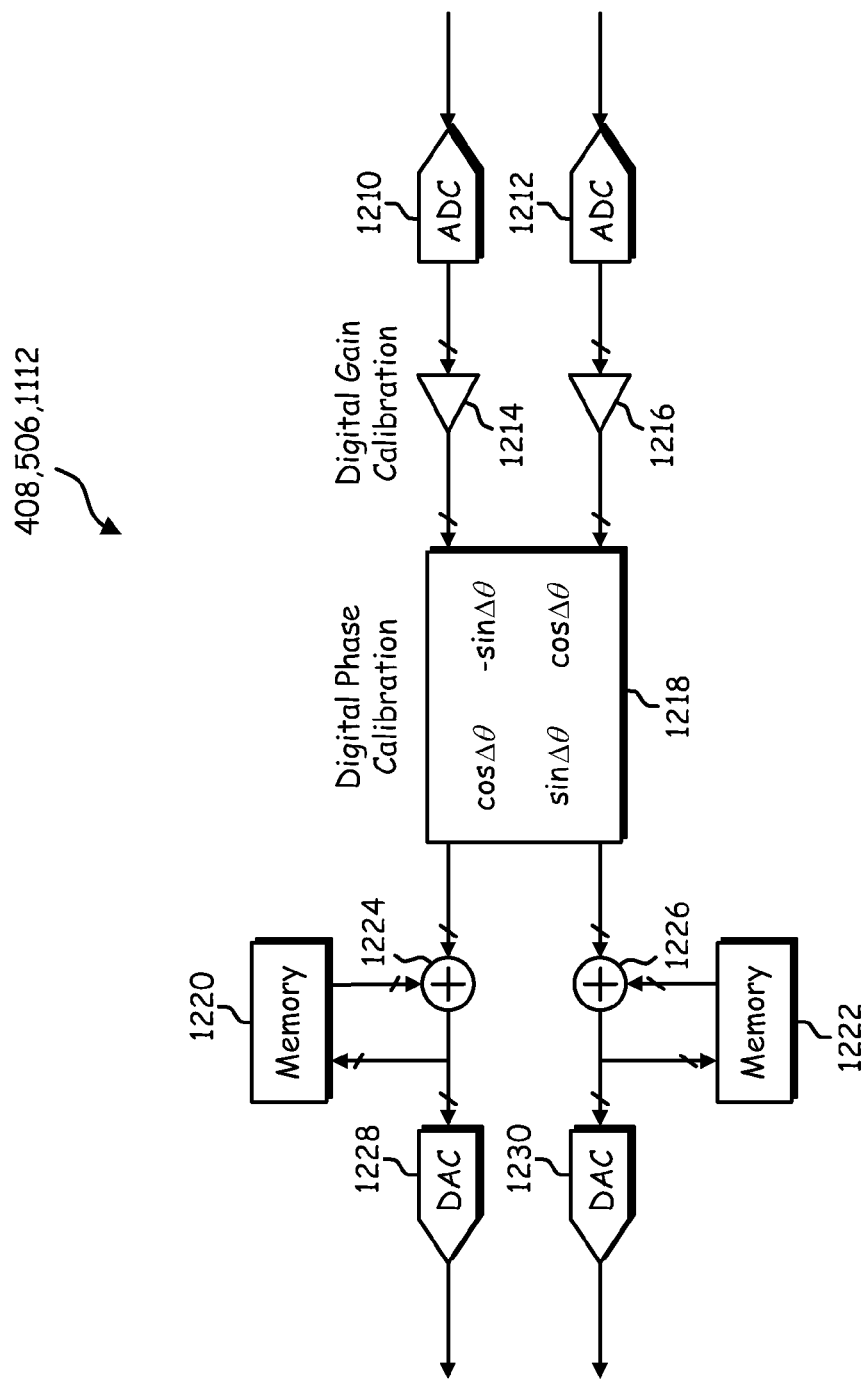
FIG. 12B is a schematic block diagram illustrating another exemplary controller for use in a receiver capable of canceling blocking signals in accordance with embodiments of the present invention.

FIG. 12B is a schematic block diagram illustrating another exemplary controller 408, 506, 1112 for use in a receiver capable of canceling blocking signals in accordance with embodiments of the present invention. The controller architecture of FIG. 12B is similar to the controller architecture of FIG. 12A. However, in FIG. 12B, the controller 408, 506, 1112 operates on both differential input signals at the same time. Thus, the controller 408, 506, 1112 of FIG. 12B includes a pair of analog-to-digital converters (ADCs) 1210 and 1212, a pair of digital integrators, each formed of respective memories 1220 and 1222 and respective summation nodes 1224 and 1226 coupled in respective feedback loops, and a pair of digital-to-analog converters (DACs) 1228 and 1230 coupled to respective digital integrators. The controller 408, 506, 1112 also includes digital gain calibration modules 1214 and 1216 coupled to respective ADCs 1210 and 1220 and a digital phase calibration module 1218 coupled to the digital gain calibration modules 1214 and 1216 and to the digital integrators.

The ADCs 1210 and 1212 are coupled to digitize respective ones of the differential signals input to the controller 408, 506, 1112 (for example, RSSI signals from FIG. 4 or 5 or Leak-I and Leak Q from FIG. 11) to produce respective digital signals. The digital gain calibration modules 1214 and 1216 and digital phase calibration module 1218 adjust the gain and phase, respectively, of the digital signals to account for any non-idealities in the non-zero loop phase and non-unity loop gain in the feedback loop. The memories 1220 and 1222 and respective summation nodes 1224 and 1226 of the digital integrators operate to increase or decrease the error signals (for example, I-CTRL and Q-CTRL) based on the digital outputs of the digital phase calibration module 1218. Just as in FIG. 12A, as the DC power of the modified blocking signal is minimized (through the feedback loop), the changes made to the error signals by the digital integrators are also minimized.

Figure 13:
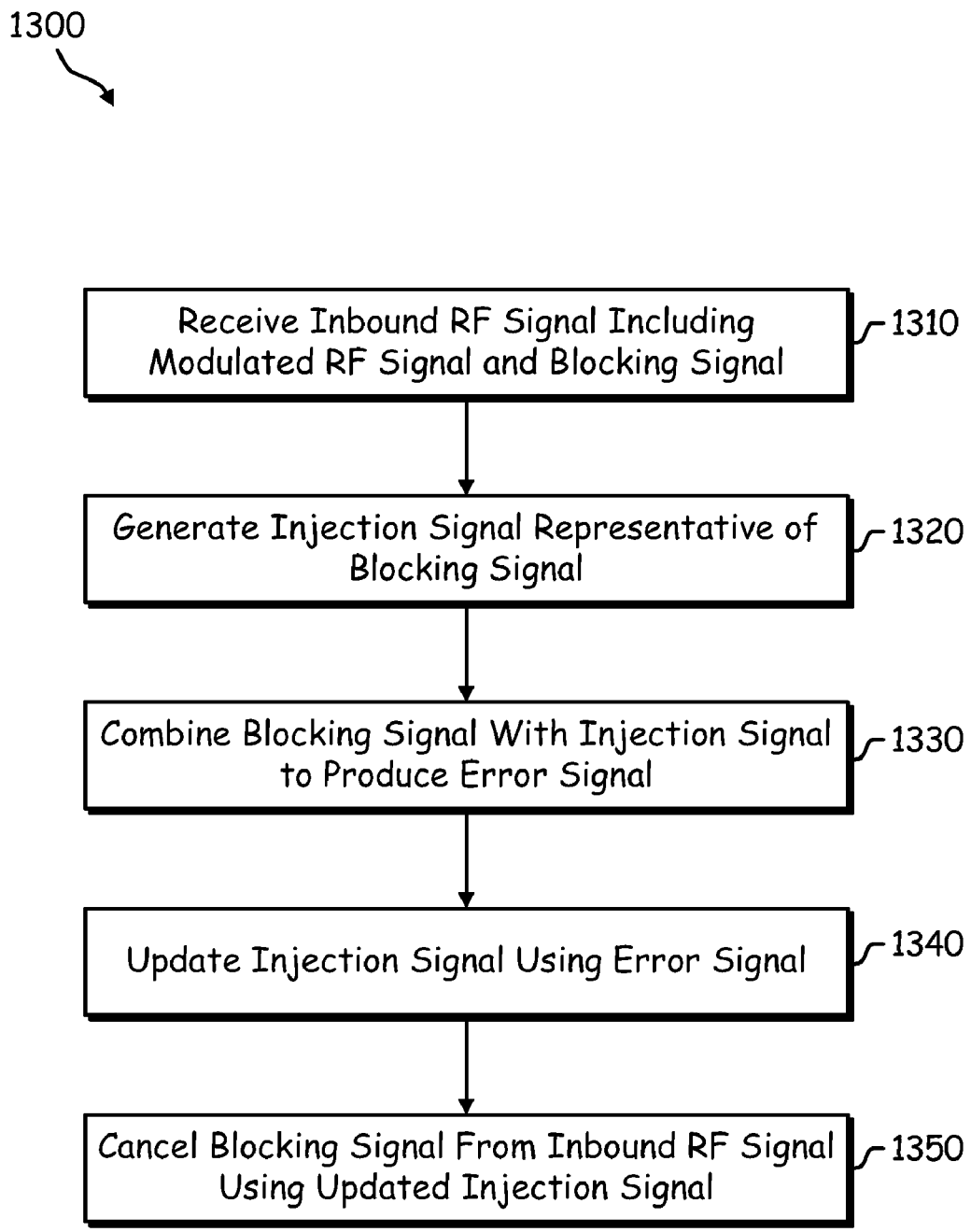
FIG. 13 is a logic diagram of a method for canceling blocking signals at a receiver in accordance with embodiments the present invention.

FIG. 13 is a logic diagram of a method 1300 for canceling blocking signals at a transceiver including a transmitter and a receiver in accordance with the present invention. The method begins at step 1310, where the receiver receives an inbound RF signal from a source (for example, an RFID tag or another wireless communication device). The inbound RF signal includes at least a modulated RF signal produced by the source. The inbound RF signal may further include a blocking signal resulting from leakage of an outbound RF signal from the transmitter to the receiver and/or reflection of the outbound RF signal off objects in the environment around the transceiver.

The process then proceeds to step 1320, where an injection signal representative of the blocking signal in the inbound RF signal is generated. For example, in one embodiment, the injection signal is generated from the outbound RF signal transmitted by the transmitter. In another embodiment, the injection signal is generated from the inbound RF signal. Thereafter, at step 1320, the injection signal is combined with the blocking signal to produce an error signal indicative of the difference in amplitude (gain) between the injection signal and the blocking signal. In some embodiments, the error signal is also indicative of the difference in phase between the injection signal and the blocking signal.

The process then proceeds to step 1340, where the injection signal is updated using the error signal. For example, the amplitude and/or phase of the injection signal can be modified based on the error signal. At step 1350, the blocking signal is substantially canceled from the inbound RF signal using the updated injection signal to substantially isolate the modulated RF signal.

As such, blocker filtering RF front-ends (BF-RF) are introduced based on the injection of the blocker within the LNA, using feed-forward or feedback loops, to create deep notches at blocker band, while introducing no loss at desired signal band. The shape of the notch is determined by the low pass filter frequency behavior of the on-chip RC elements, and then the notch is upconverted to the radio frequency of the blocker using transmitter local oscillator (TX LO).

Figure 14:
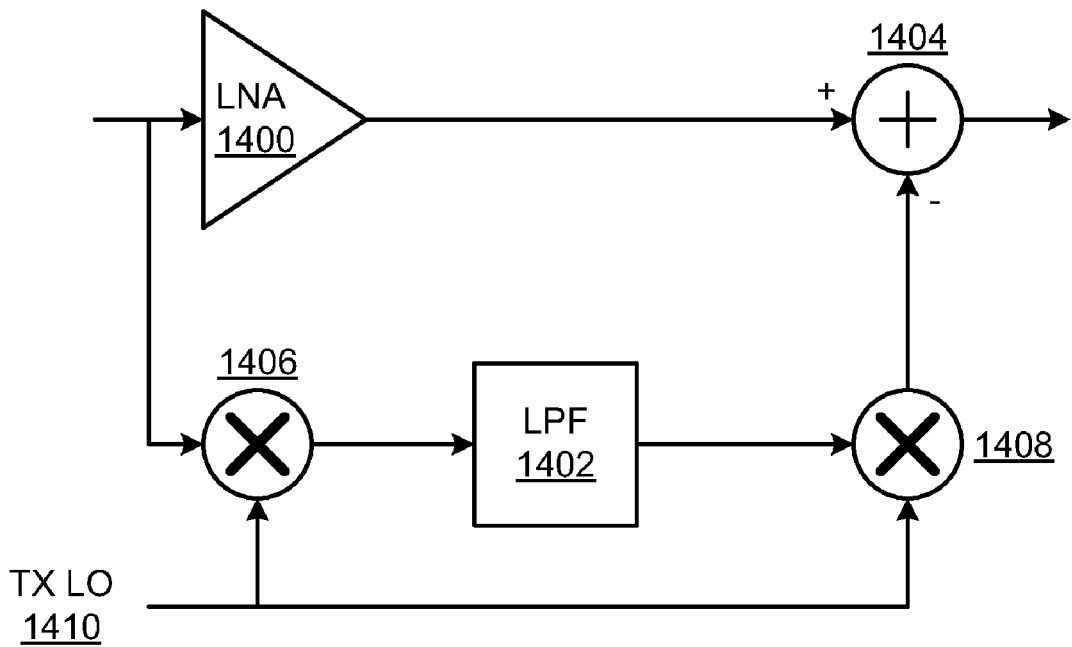
FIG. 14 is a schematic block diagram of an embodiment of an RF front end in accordance with the present invention.

FIG. 14 is a schematic block diagram of an embodiment of a feedforward blocker filtering RF front-ends (BF-RF), which utilizes two parallel paths. In the main path both the blocker and desired signal are amplified by the LNA 1400, however the output of the second path is only the blocker replica and the desired signal will be rejected in the second path, as will be explained later. The outputs of the two paths are then subtracted via subtraction module 1404 from each other and the blocker cancels out but the desired signal is amplified.

The blocker replica is generated from either the input or the output of the LNA 1400 in a feedforward or feedback scheme, respectively. In feedforward method the blocker is taken form the input of the LNA. The down conversion mixers 1406, derived by TX LO 1410, down convert the blocker to DC or low IF, and the desired signal to IF. Afterwards the low pass filter (LPF) 1402 retains the blocker and rejects the desired signal at IF. Another mixer 1408 then up converts the DC or low IF blocker to the RF, creates a notch at the TX LO frequency. The notch bandwidth is determined arbitrary by the LPF corner frequency, and the notch depth depends on the matching between the blocker amplitude and phase at the output of LNA and second path.

Figure 15:
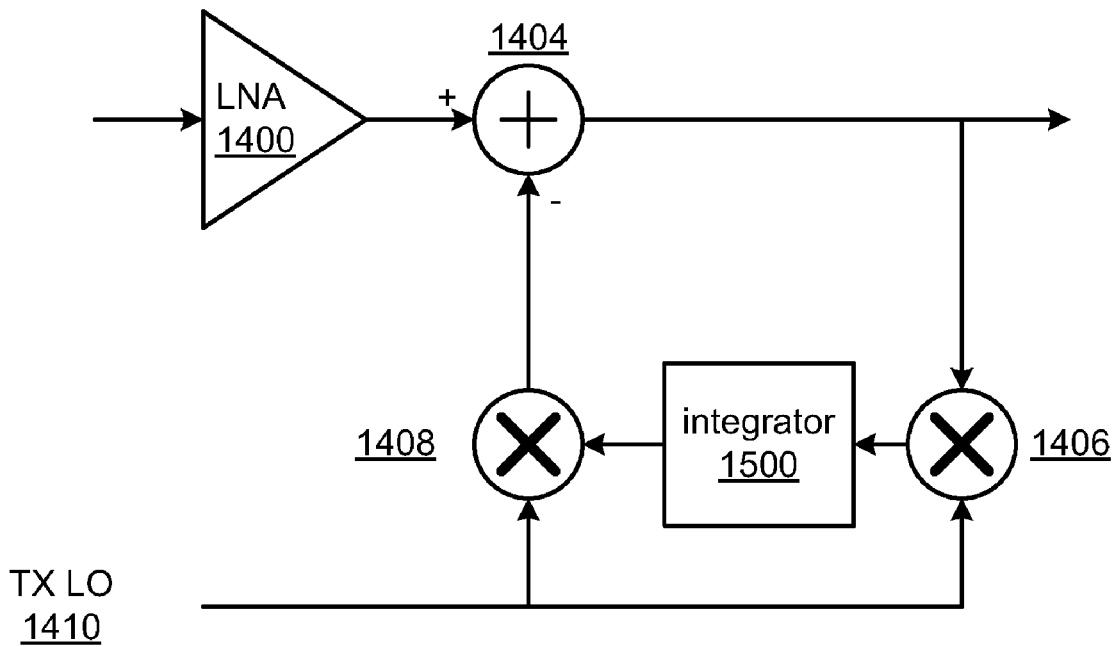
FIG. 15 is a schematic block diagram of another embodiment of an RF front end in accordance with the present invention.

FIG. 15 is a schematic block diagram of an embodiment of a feedback blocker filtering RF front-ends (BF-RF), which utilizes two parallel paths. In this embodiment, the blocker is reconstructed from the integration (accumulation) 1500 of the error signals, sampled at the LNA's 1400 output. The blocker (leakage), injection and error signals are continuous in time. The initial injection is estimated as the $Inj_1$ due to the saturation, mismatch, or other non-idealities of the loop. Then with the accumulation of the previous injection and current error vector, $Err_1$, the vector of $Inj_2$ is estimated. This recursive process $Inj_n = Inj_{n-1} + Err_{n-1}$ continues until $Inj_n \approx Inj_{n-1}$ ($Err_n \approx 0$). Due to the recursive nature of the feedback loop, the system is robust to non-idealities, such as non-zero phase and non-unity gain around the loop. Similar to the feedforward method, the integration time-constant ($\tau$) defines the notch frequency shape.

The frequency shape of the filter can be obtained for both the feedback and feedforward BF-RF loops, which create notches at DC, or a high pass transfer function. Then the TX LO 1410 up converts the notch frequency shape from DC to TX LO. Therefore the notch bandwidth is defined by the low-frequency transfer function; but the notch frequency independently is determined by TX LO, in compared to conventional RF notch filters where the frequency response and notch frequency relate to each other and strongly depend on the quality factor of the passive elements, particularly the on-chip inductors at high frequencies.

In the embodiment of FIG. 15, the feedback loop samples and processes the error signal which is a small signal, except the initial injection and error signals which are large signals. Then by integration of the small error signals the blocker replica amplitude and phase matches to the ones of the blocker at the LNA's output for maximum cancellation. However in feedforward scheme the loop samples the large blocker from the input.

Moreover any non-idealities in feedforward path of FIG. 14, such as quadrature signal mismatches, degrade the blocker rejection and gives rise to the need for extra calibration circuits to compensate the mismatch. The feedback scheme of FIG. 15, however, is more robust against such non-idealities and mismatches, since these issues are addressed by the feedback. Simulation results show that a 10° I/Q phase mismatch degrades the blocker rejection by 16.5 and only 0.8 dB in feedforward and feedback schemes, respectively. Also 1 dB I/Q gain mismatch degrades the blocker rejection by 11.3 and only 0.5 dB for feedforward and feedback schemes, respectively. Furthermore, in the feedback scheme the input matching is not affected by the filtering being ON or OFF, but in feedforward configuration the input capacitance and matching change with the ON or OFF filtering.

Note that when using quadrature TX LO (transmit local oscillation) signals, the blocker replicas and error signals are quadrature, therefore the injected blocker replica at the output of the upconversion mixers in the loop only contains single-sided band injection, rather than double-side band injection. The quadrature implementation of the feedback BF-RF is shown in FIG. 16.

Figure 16:
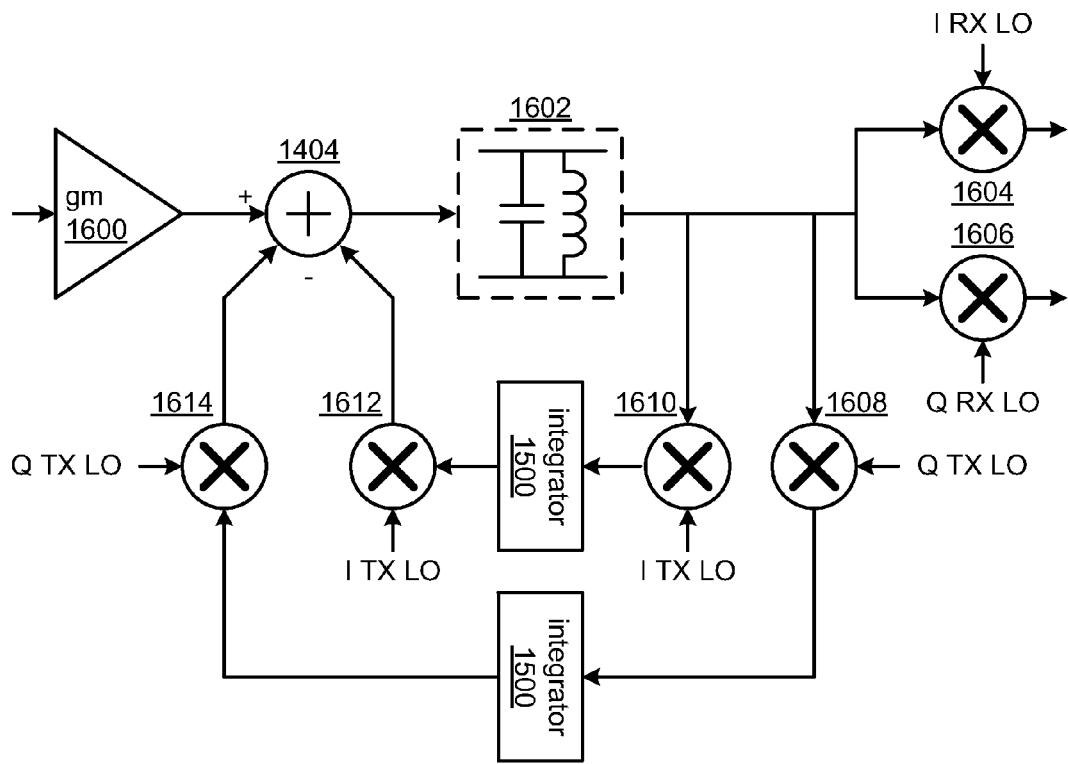
FIG. 16 is a schematic block diagram of another embodiment of an RF front end in accordance with the present invention.

As shown in FIG. 16, the blocker injection is in current mode due to its simple implementation of just connecting of the nodes, compared to voltage injection, in which a transformer might be needed before the LNA. Therefore the input transconductance ($g_m$) of the LNA 1600 converts the blocker and desired signal to the current linearly, and the loop also produces the blocker replica current. Therefore the blocker is cancelled in current before reaching the LNA output which is high impedance node of the circuit.

Ideally, the blocker filtering loop 1602 (which includes elements 1404, 1500, 1608-1614, and 1602) rejects the blocker at the LNA's output; hence it imposes no out-of-band linearity requirements on the down conversion I/Q mixers. For a two-tone input the system becomes single tone at the LNA and mixer interface. Ideally, this means that no distortion terms will be generated by the mixers 1604 and 1606 and all the nonlinearity distortions (IMD, XMD) come from the LNA, and more precisely only from its input $g_m$.

The noise injection, similar to the blocker replica injection, is at TX LO frequency, which is tens of MHz away from the desired RX band. Therefore the upconverted flicker noise of the filtering path by TX LO is negligible at RX band. Furthermore the thermal noise of the filtering down conversion mixers at IF is rejected in the filtering path similar to the desired RX signal. Only the thermal noise of upconversion mixers at IF is translated to the RX band by TX LO which degrades the NF; however by design this thermal noise is minimized to degrade the NF less than only 0.5 dB. This is the same for both feedforward and feedback schemes.

Compared to the conventional front-ends with off-chip RF SAW filters, the proposed BF-RF consumes power to actively create deep notches at the blocker frequency. However the loop becomes active based on the TX power profile and its probability of happening. Moreover the filtering power dissipation is proportional to the PA output power. Therefore for each TX output power the added power dissipation by the blocker filtering is calculated as the filtering power dissipation multiplied by the probability of the PA output power. As an example, for different TX output power the average added power dissipation by the blocker filtering is 2 and 1.3 mA for data and voice calls, respectively, for TX output powers more than 0 dBm. Compared to the current consumption of the receiver without filtering, that is, 24 mA, the blocker filtering adds on average less than 8.5% to the total power consumption. For the rest of the TX power levels (less than 0 dBm) the receiver deploys conventional LNA gain/attenuation setting ($G_1$, $G_2$, $G_{1N}$, $G_{2N}$ in FIG. 6) to meet the linearity specs.

Another concern in a WCDMA system is the duplexer group delay, which un-correlates the TX carrier and the data in the envelope. Therefore replicating the blocker (TX leakage) from the power of the TX antenna degrades the blocker rejection ratio. Moreover the resultant residue of the TX leakage increases the noise floor of the receiver which degrades RX sensitivity. However in the proposed feedforward and feedback schemes the blocker is replicated from the signals after the duplexer; hence the blocker rejection is insensitive to duplexer group delay.

Figure 17:
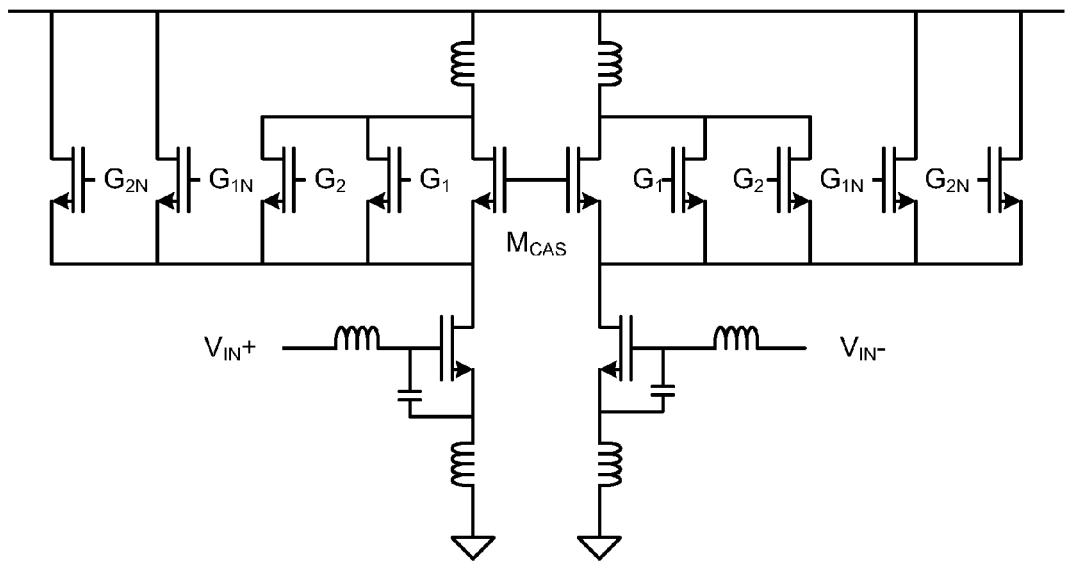
FIG. 17 is a schematic block diagram of an embodiment of a low noise amplifier in accordance with the present invention.

The feedback blocker filtering RF front-end of FIG. 15 may be used in WCDMA systems because of its intrinsic robustness against the loop non-idealities and mismatches. In such an embodiment, the LNA 1400 may be implemented as shown in FIG. 17 and the RX and TX up/down conversion mixers may be double-balanced Gilbert cells that provide more immunity to common mode noises. The differential output currents of the upconversion mixers in the loop are directly injected to the source of LNA cascade devices ($M_{CAS}$), which avoids large current excursion in them, and then minimizes the flicker noise upconversion of the $M_{CAS}$ devices.

As may be used herein, the terms "substantially" and "approximately" provide an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" includes direct coupling between items and/or indirect coupling between items via an intervening item (for example, an item includes, but is not limited to, a component, an element, a circuit, and/or a module) where, for indirect coupling, the intervening item does not modify the information of a signal but may adjust its current level, voltage level, and/or power level. As may further be used herein, inferred coupling (that is, where one element is coupled to another element by inference) includes direct and indirect coupling between two items in the same manner as "coupled to". As may even further be used herein, the term "operable to" indicates that an item includes one or more of power connections, input(s), output (s), et cetera, to perform one or more its corresponding functions and may further include inferred coupling to one or more other items. As may still further be used herein, the term "associated with", includes direct and/or indirect coupling of separate items and/or one item being embedded within another item.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has also been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The preceding discussion has presented a receiver architecture for canceling blocking signals and method of operation thereof. As one of ordinary skill in the art will appreciate, other embodiments may be derived from the teaching of the present invention without deviating from the scope of the claims.

What is claimed is:

1. A receiver within a wireless communication device for use in a wireless communication system, comprising:
    a low noise amplifier to receive an inbound radio frequency (RF) signal and to produce an amplified inbound RF signal, wherein the inbound RF signal including a modulated RF signal and a blocking signal;
    a cancellation module to generate a signal representative of the blocking signal, wherein the cancellation module operates to substantially cancel the blocking signal from the amplified inbound RF signal based on the signal representative of the blocking signal and substantially pass the modulated RF signal;
    a down-conversion module coupled to convert the modulated RF signal to a near baseband signal;
    a filtering and digitizing module coupled to filter and digitize the near baseband signal to produce a digital baseband signal; and
    a processing module coupled to convert the digital baseband signal into an inbound signal.

2. The receiver of claim 1, wherein the cancellation module comprises:
    generating a baseband representation of the blocking signal based on the inbound RF signal and a transmit local oscillation;
    generating the signal representative of the blocking signal based on the transmit local oscillation and the baseband representation of the blocking signal; and
    subtracting the signal representative of the blocking signal from the amplified inbound RF signal to substantially pass the modulated RF signal.

3. The receiver of claim 1, wherein the cancellation module comprises:
    a first mixing module coupled to mix the inbound RF signal with a transmit local oscillation to produce a first mixed signal;
    a filter module coupled to filter the first mixed signal to produce a DC or low intermediate frequency (IF) representation of the blocking signal;
    a second mixing module coupled to mix the DC or low IF representation of the blocking signal with the transmit local oscillation to produce the signal representative of the blocking signal; and
    a subtraction module for subtracting the signal representative of the blocking signal from the amplified inbound RF signal to substantially pass the modulated RF signal.

4. The receiver of claim 1, wherein the cancellation module comprises:
    determining an error signal based on a difference between the passed modulated RF signal and the signal representative of the blocking signal;
    generating the signal representative of the blocking signal based on a transmit local oscillation and the error signal; and
    subtracting the signal representative of the blocking signal from the amplified inbound RF signal to produce the passed modulated RF signal.

5. The receiver of claim 1, wherein the cancellation module comprises:
    a first mixing module coupled to mix a transmit local oscillation with an error signal to produce the signal representative of the blocking signal;
    a subtraction module coupled to subtract the signal representative of the blocking signal from the amplified inbound RF signal to produce the passed modulated RF signal;
    a second mixing module coupled to mix the passed modulated RF signal with a transmit local oscillation to produce a difference signal; and
    an accumulation module coupled to convert the difference signal into the error signal.

6. The receiver of claim 1, wherein the cancellation module comprises:
    a first mixing module coupled to mix an in-phase component of a transmit local oscillation with an in-phase component of an error signal to produce an in-phase component of the signal representative of the blocking signal;
    a subtraction module coupled to subtract the in-phase component of the signal representative of the blocking signal from an in-phase component of the amplified inbound RF signal to produce an in-phase component of the passed modulated RF signal;
    a second mixing module coupled to mix an in-phase component of the passed modulated RF signal with the in-phase component of the transmit local oscillation to produce an in-phase component of a difference signal;
    a first accumulation module coupled to convert the in-phase component of the difference signal into the in-phase component of the error signal;
    a third mixing module coupled to mix a quadrature component of the transmit local oscillation with a quadrature component of an error signal to produce a quadrature component of the signal representative of the blocking signal;
    a second subtraction module coupled to subtract the quadrature component of the signal representative of the blocking signal from a quadrature component of the amplified inbound RF signal to produce a quadrature component of the passed modulated RF signal;
a fourth mixing module coupled to mix a component of the passed modulated RF signal with the quadrature component of the transmit local oscillation to produce a quadrature component of a difference signal; and
a second accumulation module coupled to convert the quadrature component of the difference signal into the quadrature component of the error signal.

7. The receiver of claim 1, wherein the inbound RF signal is formatted in accordance with a wide bandwidth code division multiple access (WCDMA) protocol.

8. The receiver of claim 1, wherein the filtering and digitizing module comprises:
an analog bandpass filter coupled to bandpass filter the near baseband signal to produce a filtered near baseband signal; and
an analog to digital conversion module coupled to convert the filtered near baseband signal into the digital baseband signal.

9. The receiver of claim 1, wherein the filtering and digitizing module comprises:
an analog to digital conversion module coupled to convert the near baseband signal into a near baseband digital signal; and
a digital bandpass filter coupled to bandpass filter the near baseband digital signal to produce the digital baseband signal.

10. A wide bandwidth code division multiple access (WCDMA) receiver comprises:
a low noise amplifier to receive an inbound WCDMA radio frequency (RF) signal and to produce an amplified inbound WCDMA RF signal, wherein the inbound WCDMA RF signal including a WCDMA RF signal and a blocking signal;
a feedback cancellation module to generate a signal representative of the blocking signal, wherein the cancellation module operates to substantially cancel the blocking signal from the amplified inbound WCDMA RF signal based on the signal representative of the blocking signal and substantially pass the WCDMA RF signal;
a down-conversion module coupled to convert the passed WCDMA RF signal to a near baseband signal;
a filtering and digitizing module coupled to filter and digitize the near baseband signal to produce a digital baseband signal; and
a processing module coupled to convert the digital baseband signal into an inbound signal in accordance with a WCDMA data demodulation protocol.

11. The WCDMA receiver of claim 10, wherein the feedback cancellation module comprises:

determining an error signal based on a difference between the passed modulated RF signal and the signal representative of the blocking signal;
generating the signal representative of the blocking signal based on a transmit local oscillation and the error signal; and
subtracting the signal representative of the blocking signal from the amplified inbound RF signal to produce the passed modulated RF signal.

12. The WCDMA receiver of claim 10, wherein the cancellation module comprises:
a first mixing module coupled to mix a transmit local oscillation with an error signal to produce the signal representative of the blocking signal;
a subtraction module coupled to subtract the signal representative of the blocking signal from the amplified inbound RF signal to produce the passed modulated RF signal;
a second mixing module coupled to mix the passed modulated RF signal with the transmit local oscillation to produce a difference signal; and
an accumulation module coupled to convert the difference signal into the error signal.

13. The WCDMA receiver of claim 10 further comprises:
the low noise amplifier including an transconductance ($g_m$) amplifier that converts the WCDMA RF signal and the blocking signal into a current signal;
a subtraction module coupled to subtract a current representative of the blocking signal from the current signal to produce a blocker cancelled current signal;
a loop filter coupled to convert the blocker cancelled current signal into the passed WCDMA RF signal; and
a feedback module coupled to generate the current representative of the blocking signal from the passed WCDMA RF signal and a transmit local oscillation.

14. The WCDMA receiver of claim 10, wherein the filtering and digitizing module comprises:
an analog bandpass filter coupled to bandpass filter the near baseband signal to produce a filtered near baseband signal; and
an analog to digital conversion module coupled to convert the filtered near baseband signal into the digital baseband signal.

15. The WCDMA receiver of claim 10, wherein the filtering and digitizing module comprises:
an analog to digital conversion module coupled to convert the near baseband signal into a near baseband digital signal; and
a digital bandpass filter coupled to bandpass filter the near baseband digital signal to produce the digital baseband signal.

* * * * *